(12) United States Patent
Granito

(10) Patent No.: US 7,814,100 B2
(45) Date of Patent: Oct. 12, 2010

(54) SEARCHING ELECTRONIC CONTENT IN INSTANT-MESSAGING APPLICATIONS

(75) Inventor: Jennifer Granito, Springfield, VA (US)

(73) Assignee: AOL Inc., Dulles, VA (US)

( * ) Notice: Subject to any disclaimer, the term of this patent is extended or adjusted under 35 U.S.C. 154(b) by 964 days.

(21) Appl. No.: 11/238,129

(22) Filed: Sep. 29, 2005

(65) Prior Publication Data

US 2006/0259474 A1 Nov. 16, 2006

Related U.S. Application Data

(60) Provisional application No. 60/679,652, filed on May 11, 2005, provisional application No. 60/710,581, filed on Aug. 24, 2005.

(51) Int. Cl.
*G06F 17/30* (2006.01)
(52) U.S. Cl. .................................................. 707/732
(58) Field of Classification Search .......... 707/999.003, 707/732
See application file for complete search history.

(56) References Cited

U.S. PATENT DOCUMENTS

| | | | |
|---|---|---|---|
| 5,995,023 | A | 11/1999 | Kreft |
| 6,249,740 | B1 | 6/2001 | Ito et al. |
| 6,351,698 | B1 | 2/2002 | Kubota et al. |
| 6,363,392 | B1 | 3/2002 | Halstead et al. |
| 6,654,683 | B2 | 11/2003 | Jin et al. |
| 2002/0077080 | A1 | 6/2002 | Greene |
| 2002/0133292 | A1 | 9/2002 | Miyaki |
| 2002/0193942 | A1 | 12/2002 | Odakura et al. |
| 2003/0182394 | A1 | 9/2003 | Ryngler et al. |
| 2004/0260762 | A1 | 12/2004 | Fish |
| 2005/0038856 | A1 | 2/2005 | Krishnasamy et al. |
| 2005/0060377 | A1 | 3/2005 | Lo et al. |
| 2005/0080863 | A1* | 4/2005 | Daniell ........................ 709/206 |
| 2005/0086211 | A1* | 4/2005 | Mayer ............................. 707/3 |
| 2005/0153681 | A1* | 7/2005 | Hanson .................... 455/404.2 |
| 2006/0075044 | A1* | 4/2006 | Fox et al. ..................... 709/206 |
| 2006/0168054 | A1* | 7/2006 | Burkhart et al. ............. 709/206 |

(Continued)

FOREIGN PATENT DOCUMENTS

WO WO 02/062039 8/2002

(Continued)

OTHER PUBLICATIONS

International Search Report, Application Serial No. PCT/US2006/018286, dated Oct. 19, 2006, 12 pages.

(Continued)

*Primary Examiner*—Neveen Abel Jalil
*Assistant Examiner*—Bai D Vu
(74) *Attorney, Agent, or Firm*—Finnegan, Henderson, Farabow, Garrett & Dunner LLP

(57) ABSTRACT

Searching electronic content in an instant-messaging application includes obtaining input that specifies a search criterion and that further identifies a first set of users. Each user in the first set has stored electronic content that provides information about that user. The stored electronic content associated with each user in the first set is searched, and a second set of users that includes users in the first set with stored electronic content that satisfies the specified search criterion is identified. An indication of the identified users within the second set is provided.

43 Claims, 14 Drawing Sheets

U.S. PATENT DOCUMENTS

2006/0173824 A1* 8/2006 Bensky et al. .................. 707/3
2006/0212561 A1* 9/2006 Feng .......................... 709/223
2006/0277187 A1 12/2006 Roese et al.

FOREIGN PATENT DOCUMENTS

WO    WO 2004/028178      4/2004

OTHER PUBLICATIONS

BuddyGopher~About, available on Jul. 13, 2004, reprinted from http://web.archive.org/web/20040713002836/www.buddygopher.com/about.html on Sep. 28, 2005 (4 pgs).

BuddyGopher~We Love Away Messages!, "BuddyGopher simultaneously checks the away messages of your favorite AIM® buddies.", available on Sep. 24, 2004, reprinted from http://web.archive.org/web/20040924104001/http://www.buddygopher.com/ on Sep. 28, 2005 (2 pgs).

Dodgeball.com:: mobile social software, "Hook up with friends. Discover what's around you.", available on Nov. 30, 2003, reprinted from http://web.archive.org/web/20041130034344/www.dodgeball.com/social/index.php on Sep. 28, 2005 (2 pgs).

Dodgeball.com:: mobile social software, "help: the basics", available on Oct. 9, 2004, reprinted from http://web.archive.org/web/20041009200739/www.dodgeball.com/social/help_basics.php on Sep. 28, 2005 (2 pgs).

Dodgeball.com:: mobile social software, "help: text messaging", available on Oct. 13, 2004, reprinted from http://web.archive.org/web/20041013034241/www.dodgeball.com/social/help_text.php on Sep. 28, 2005 (3 pgs).

Dodgeball.com:: mobile social software, "help: use it", available on Oct. 9, 2004, reprinted from http://web.archive.org/web/20041009201853/www.dodgeball.com/social/help_useit.php on Sep. 28, 2005 (2 pgs).

Office Action, U.S. Appl. No. 11/238,110, dated Nov. 29, 2007, 11 pages.

Office Action, U.S. Appl. No. 11/238,110, dated Jul. 9, 2008, 11 pages.

* cited by examiner

500

SEARCHING ELECTRONIC CONTENT IN INSTANT-MESSAGING APPLICATIONS

CROSS-REFERENCE TO RELATED APPLICATION

This application claims the benefit of U.S. Provisional Application Ser. No. 60/679,652, titled "Processing Information Describing Electronic Messaging Users," and filed May 11, 2005, and U.S. Provisional Application Ser. No. 60/710,581, titled "Searching Electronic Content in Instant-Messaging Applications," filed Aug. 24, 2005. This application is related to U.S. patent application Ser. No. 11/238,110 being filed concurrently on Sep. 29, 2005, and titled "Personalized Location Information for Mobile Devices" and titled "Identifying Users Sharing Common Characteristics." The entire contents of all of the above applications are hereby incorporated by reference in their entirety.

TECHNICAL FIELD

This application relates to the searching of electronic content in instant-messaging applications.

BACKGROUND

In instant-messaging applications, users may communicate with each other by exchanging instant messages. An individual user may have a buddy list that includes the names of other users, known as "buddies," with whom the user may communicate regularly. The user may send instant messages to any of the buddies, as well as other users not included in the buddy list, that are logged on to their respective computing stations. Any one of these buddies may store electronic content that can be shared with other users. For example, a buddy may store an "away" message that can be provided as an auto-response to other users to indicate that the buddy is presently away from his or her computing station or is otherwise unavailable to send and receive instant messages.

Away messages can serve several purposes. Many people use them to let others, such as their buddies, know exactly where they are. Others use away messages to provide creative expression, such as by publishing the lyrics of the song they just wrote or a funny quote they just heard in a movie. Recent studies have shown that individuals of certain age groups (such as college-aged adults) not only invest a fair amount of time creating multiple away messages per day, but they also spend a great deal of time reading the away messages of their buddies.

A very common use of away messages is to post your current location or activity so that buddies can easily keep track of where you are and be informed enough to join in your activity if they are up to it. Users often trust this service as a place to keep their personal information, such as contact information, so their friends can get in touch with them at any time. They use it to share information such as links to pictures, web logs (blogs), funny articles, declarations of love to a boyfriend/girlfriend, a countdown until the day they graduate, and other things of value. It is a quick way to provide a glimpse into the user's life and, in most cases, it also may provide a way to get more information about the user if a buddy wants to spend the time to do so.

SUMMARY

In one general aspect, searching electronic content in an instant-messaging application includes obtaining input that specifies a search criterion and that further identifies a first set of users. Each user in the first set has stored electronic content that provides information about that user. The stored electronic content associated with each user in the first set is searched, and a second set of users that includes users in the first set with stored electronic content that satisfies the specified search criterion is identified. An indication of the identified users within the second set is provided.

Implementations may include one or more of the following features. For example, the search criterion may indicate an event that the users in the first set may attend, and the electronic content stored for a user in the first set may indicate an event that the user is attending. Identifying a second set of users may include identifying a second set of users that includes users in the first set with stored electronic content that indicates the event indicated by the search criterion.

The search criterion may indicate an activity in which the users in the first set may participate, and the electronic content stored for a user in the first set may indicate an activity in which the user may participate. Identifying a second set of users may include identifying a second set of users that includes users in the first set with stored electronic content that indicates the activity indicated by the search criterion.

The search criterion may indicate a characteristic of the users in the first set, and the electronic content stored for a user in the first set may indicate a characteristic of the user. Identifying a second set of users may include identifying a second set of users that includes users in the first set with stored electronic content that indicates the characteristic indicated by the search criterion.

The search criterion may indicate a location at which the users in the first set may be located, and the electronic content stored for a user in the first set may indicate a location of the user. Identifying a second set of users may include identifying a second set of users that includes users in the first set with stored electronic content that indicates the location indicated by the search criterion.

The search criterion may indicate a physical geographic location at which the users in the first set may be located, and the electronic content stored for a user in the first set may indicate a physical geographic location of the user. Identifying a second set of users may include identifying a second set of users that includes users in the first set with stored electronic content that indicates the physical geographic location indicated by the search criterion.

The search criterion may indicate multiple locations at which the users in the first set may be located. Identifying a second set of users may include identifying a second set of users that includes users in the first set with stored electronic content that indicates at least one of the multiple locations indicated by the search criterion.

Identifying a second set of users may include identifying a second set of users that includes users in the first set with stored electronic content that indicates a location that is within a threshold distance of the location indicated by the search criterion. Whether the location indicated by the search criterion and the location indicated by the stored electronic content represent different names for a common location may be identified.

The stored electronic content for a user in the first set may include an electronic message indicating the availability of the user to send and receive electronic messages. The electronic message may include audio data, video data, graphical data, or text. The stored electronic content for a user may be an indication of the location of the user that is specified by the user.

Providing an indication of the identified users within the second set may include providing an indication of at least some of the stored electronic content that satisfies the search criterion. Providing an indication of at least some of the stored electronic content that satisfies the search criterion may include enabling the user to identify at least one of the identified users whose electronic content will be provided.

Providing an indication of the identified users within the second set may include providing a visual indication of the identified users. Providing a visual indication of the identified users may include displaying a graphical user interface that includes indications of the identified users as users with stored electronic content that satisfies the specified search criterion.

Providing a visual indication of the identified users may include determining that at least one of the identified users has an identifier that is included within a list of identifiers of users for which presence information is monitored for the user. The identifier of the at least one user may be highlighted within the list of identifiers.

Providing a visual indication of the identified users may include determining that at least one of the identified users has an identifier that is included within a list of identifiers of users for which presence information is monitored for the user. A graphical icon may be displayed in proximity to the identifier of the at least one user within the list of identifiers.

Providing a visual indication of the identified users may include determining that at least one of the identified users has an identifier that is included within a list of identifiers of users for which presence information is monitored for the user. The identifier of the at least one user may be included in a group within the list for identifiers of users with stored electronic content that satisfies the specified search criterion. The group may be added to the list of identifiers, for example, when more than a threshold number of identifiers of users are to be included in the group.

Providing an indication of the identified users within the second set may include providing an audible indication of the identified users.

Obtaining input from a user that specifies a search criterion may include obtaining the search criterion from a text-entry field on a user interface that is used by the user. Obtaining input from a user that specifies a search criterion also may include obtaining a search criterion that was previously specified by the user.

Obtaining input from a user may include obtaining input from a personal computing device used by the user. Providing an indication of the identified users within the second set may include providing the indication of the identified users to the personal computing device. The personal computing device may be a mobile device.

The first set of users may include all users for which presence information is monitored for the user. The first set of users may include a group of users sharing a characteristic. The first set of users may include at least two users for which presence information is monitored for the user.

Obtaining input may include obtaining input from a user of a list of users for which online presence information is monitored that and includes the first set of users. Obtaining input may include automatically identifying the input.

The details of one or more implementations are set forth in the accompanying drawings and the description below. Other features, objects, and advantages will be apparent from the description and drawings, and from the claims.

DETAILED DESCRIPTION

A user is made able to specify search criteria to be matched against electronic content stored in association with users included in a contact list maintained by the user. The electronic content of a user may be an electronic message indicating the availability of the user to send and receive electronic messages, or information describing the user. The electronic message and the descriptive information may include text, graphical data, audio data, video data, or metadata describing the electronic message or the descriptive information. The search criteria may identify an event or activity in which the users may be participating, a characteristic that the users may exhibit, or a location at which the users may be located. Users from the contact list with electronic content that matches the search criteria may be identified on an interface displaying the contact list. For example, identifiers of the users with matching electronic content may be displayed in the contact list in a special group, or with nearby indications of the matching content.

Figure 1:
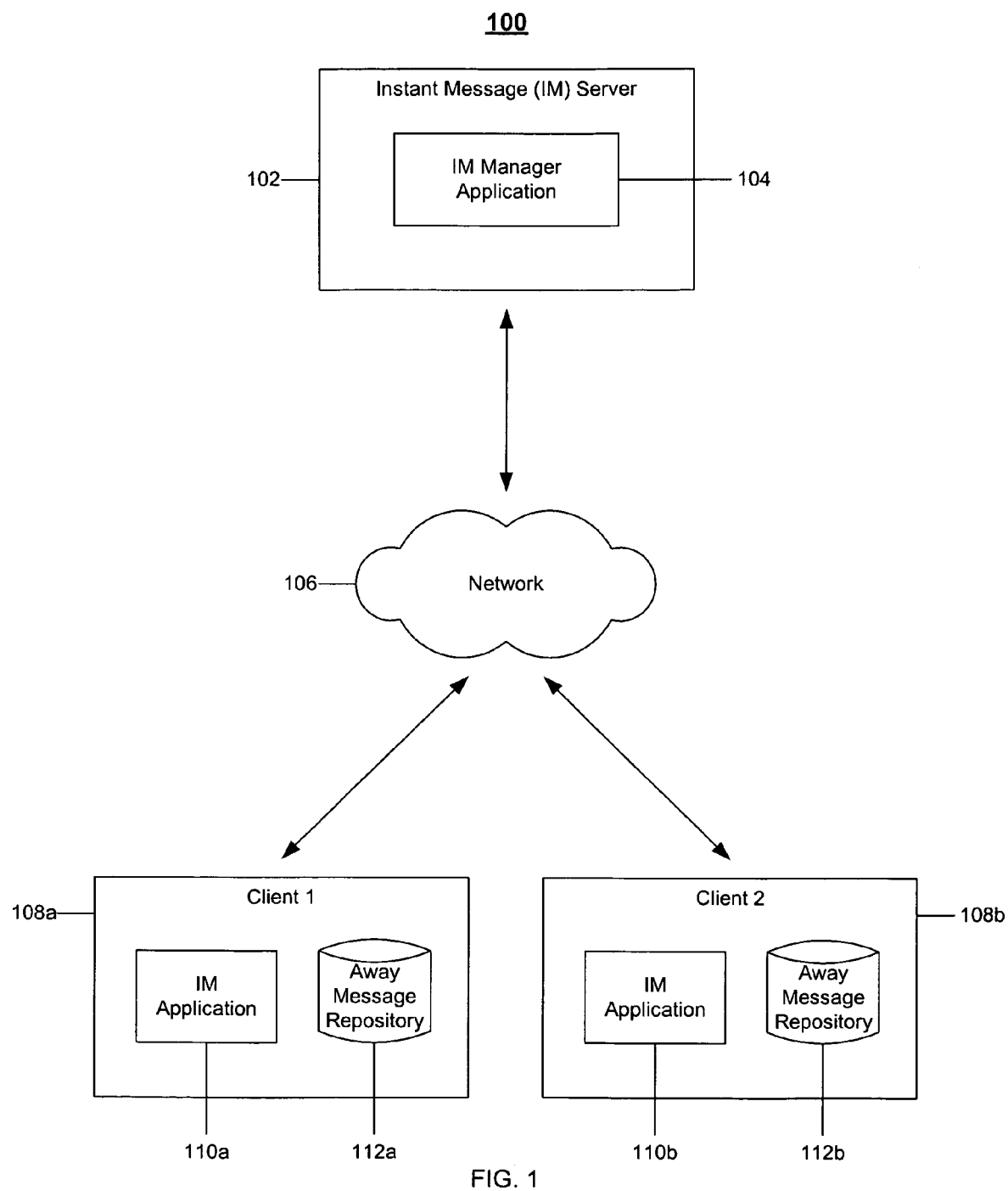
FIG. 1 is a block diagram of a networking system that is used for communication of electronic messages.

FIG. 1 is a block diagram of a networking system 100 that is used for transmission of instant messages, according to one implementation. In this implementation, the system 100 includes an instant message (IM) server 102, a network 106, and client devices 108a and 108b. The IM server 102 is coupled to both the client device 108a and the client device 108b through the network 106. The network 106 is a wide-area network (WAN) in some implementations, and a local-area network (LAN) in others. The client devices 108a and 108b may each include a computing device, such as the computing device shown in FIG. 11. In certain implementations, the client devices 108a and 108b may be mobile devices, such as portable computers, cellular telephones, or personal digital assistants (PDAs).

During operation, the client device 108a may initiate an instant-messaging session with the client device 108b and send one or more IMs to the client device 108b during the instant-messaging session. To do so, the client device 108a invokes an IM application 110a. In one implementation, a first user manually invokes the IM application 110a. In another implementation, the client device 108a automatically invokes the IM application 110a at start-up. The client device 108a also may include various other applications that operate at run-time, such as word-processing applications, web-browser applications, or mail applications. When a first user on the client device 108a wishes to begin an instant-messaging session with a second user on the client device 108b, the first user initiates a request. This request includes an address associated with the client device 108b. The IM application 110a on the client device 108a sends this request to an IM manager application 104 on the IM server 102 using the network 106.

Upon receipt of this request from the client device 108a, the IM manager application 104 uses the address contained within the request to locate the client device 108b. The IM manager application 104 then routes the request to an IM application 110b on the client device 108b using the network 106. The IM application 110b then processes this request and initiates a new instant-messaging session with the IM application 110a on the client device 108a. The second user on the client device 108b is then notified by the IM application 110b of the new session, and the first and second users of the client devices 108a and 108b are capable of exchanging IMs during the course of the instant-messaging session. The client device 108b also may contain other applications, such as word-processing applications, web-browser applications, or mail applications.

In one implementation, the client device 108a is capable of sending messages to and receiving messages from the client device 108b through the network 106 without the use of the IM server 102. In this implementation, the IM applications 110a and 110b manage all of the IM functionality on the client devices 108a and 108b, respectively. Each of the IM applications 110a and 110b is capable of authenticating and locating other client devices to enable the exchange of messages to and from the client devices 108a and 108b, respectively.

The client devices 108a and 108b include away message repositories 112a and 112b. The away message repository 112a includes one or more away messages that have been specified by a user of the client device 108a. Each of the away messages may include information describing the user. For example, an away message may include an indication of a current location or activity of the user. In addition, the away message may include an indication of the availability of the user to send and receive instant messages. Furthermore, the away message may be identifiable by a title that may be considered to be part of the away message. In one implementation, the away message may include a profile of the user. The away messages included in the away message repositories 112a and 112b may include audio data, video data, graphical data, emoticons, and/or text.

The away message repositories 112a and 112b may include multiple types of away messages. For example, the repositories 112a and 112b may include online away messages for a user that are provided when the user is available to send and receive electronic messages. Similarly, the repositories 112a and 112b may include offline away messages for a user, which are away messages that are provided when the user is not available to send and receive electronic messages. The repositories also may include profiles that include information describing the user. Location away messages, which specify only user location, and mobile away messages, which are used when the client devices 112a and 112b are mobile devices, also may be stored within the repositories 112a and 112b.

The user of the client device 108a may make one of the away messages stored in the away message repository 112a accessible to the client device 108b such that the away message may be transferred to the client device 108b for processing or for presentation to a user of the client device 108b. The user of the client device 108a may select one of the away messages from the away message repository 112a based on the information included in the away message. If none of the stored away messages include desirable information, then the user may specify a new away message including the desirable information for storage in the repository 112a. In some implementations, the user of the client device 108a may make multiple away messages included in the repository 112a accessible for transfer to the client device 108b and other client devices. The away message that is provided to the other client device may depend on an identity of a user of the other client device. For example, a first away message may be provided when the user of the other client device is a mother of the user of the client device 108a, and a second away message may be provided when the user of the other client device is a friend of the user of the client device 108a.

In one implementation, the away message repositories 112a and 112b may include old away messages that are no longer applicable to the corresponding users. For example, when the user of the client system 108a modifies an original away message, the away message repository 112a may maintain a copy of the original away message as well as the modified away message. The old away messages may be made accessible, for example, in the form of a web log (e.g., blog) such that more than just a most recent away message is accessible. Consequently, other users or systems that access the web log may be provided with indications of previous events, activities, locations, or characteristics of the user, as well as indications of more recent events, activities, locations, or characteristics of the user.

In some implementations, the IM application 110a or the IM application 110b may be configured to respond automatically to instant messages received at the client devices 108a and 108b. In addition, the IM applications 110a and 110b may be configured to perform some function identified by the received instant messages. For example, the client device 108a may represent a mobile device used by a user, and the client device 108b may be a desktop computer used by the user. In such a case, the mobile device may not include the away message repository 112a, due to limited storage and processing capabilities. Instead, away messages for the user may be provided from the away message repository 112b included in the desktop computer. The user may send an instant message from the mobile device to the desktop computer identifying an away message included in the away message repository 112b to be made available to other users. The automatic response to the received instant message may indicate that the identified away message has been made available to the other users.

In some implementations, the users of the client devices 108a and 108b may specify user information feeds that periodically provide to other users information relating to the users. Alternatively or additionally, the IM server 102 may be configured to aggregate the information relating to the users into the user information feeds on behalf of the users. The user information feed for a user may include any information related to the user, such as entries included in an online journal of the user, an away message of the user, a profile of the user, media files of interest to the user, a playlist specifying an order in which the user listens to or watches the media files, recent communications sent and received by the user, and RSS feeds of interest to the user. The client devices 108a and 108b or the IM server 102 may periodically provide the user information feeds to other users who have subscribed to the information feeds. Alternatively or additionally, the client devices 108a and 108b or the IM server 102 may provide only portions of a user information feed that have been added or changed since a previous distribution of the user information feed.

Figure 2:
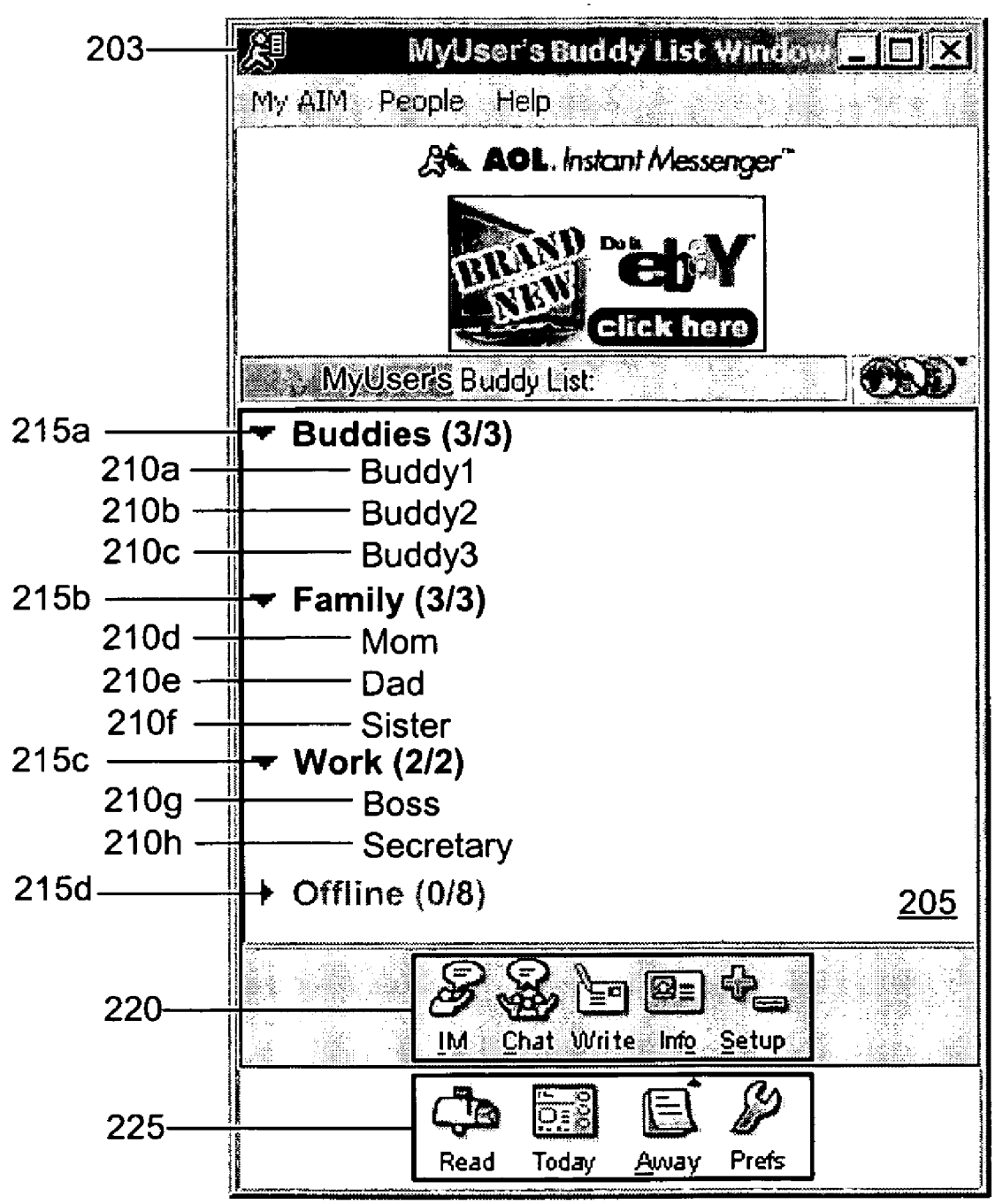
FIG. 2 is an illustration of an interface displaying identifiers of users with whom electronic messages may be exchanged.

Referring to FIG. 2, a participant list interface 200 for a given user displays the identifiers of other selected users of an instant messaging system with which the given user regularly communicates and for which presence information is monitored. The other selected users form a participant list for the given user. Communications with one of the other selected users may be initiated through selection of the identifier for the other user from the participant list. Alternatively or additionally, information describing one of the other selected users may be retrieved through selection of the identifier for the other user from the participant list.

The participant list interface 200 includes a text box 205 that contains the participant list for the given user, who is identified by an identifier "MyUser," as indicated in the title bar 203 of the participant list interface 200. The participant list in the participant list interface 200 includes multiple identifiers 210a-210h. More particularly, the participant list includes the identifiers "Buddy1" 210a, "Buddy2" 210b, "Buddy3" 210c, "Mom" 210d, "Dad" 210e, "Sister" 210g, "Boss" 210e, and "Secretary" 210h.

Each of the identifiers 210a-210h may be selected to initiate communication with a corresponding user, or to retrieve information describing the corresponding user. In one implementation, selecting one of the identifiers 210a-210h displays a menu from which an option for initiating communication with a corresponding user or an option for retrieving information describing the corresponding user may be selected. In another implementation, an icon may be displayed next to one of the identifiers 210a-210h to indicate that a corresponding user has made available self-descriptive information. The self-descriptive information may include a profile of the other user, an electronic message describing the user, or an electronic message indicating the availability of the other user to send and receive instant messages.

The identifiers within the participant list shown by participant list interface 200 are organized into multiple groups 215a-215d. Each identifier within the participant list is associated with at least one of the groups 215a-215d. The participant list includes a "Buddies" group 215a, a "Family" group 215b, a "Work" group 215c and an "Offline" group 215d. The identifier 210a appears below the heading for the group 215a because the identifier 210a has been associated with the group 215a and the corresponding user is present, that is, logged into the instant messaging system. The heading for each of the groups 215a-215c indicates the number of users in the group currently logged into the instant messaging system, as well as the total number of users in the group. For example, three out of the three members of the group 215a are logged into the instant messaging system for which the participant list interface 200 is displayed. Similarly, the heading for the "Offline" group 215d indicates the number of other users on the participant list that are not logged into the system (i.e., 0) and the total number of other users on the participant list (i.e., 8). Typically, when users log into the instant messaging system, identifiers of the users are moved from the "Offline" group 215d to one of the other groups 215a-215c.

The participant list interface 200 also includes controls 220 that enable the given user to communicate with the other selected users corresponding to the identifiers 210a-210e. For example, the given user may send instant messages, chat invitations, text messages, or e-mail messages to the communications identities referenced in the participant list through use of the controls 220. The controls 220 also enable the user to obtain information describing the other users, as well as to modify the set of other users referenced in the participant list interface 200.

The participant list interface 200 also includes controls 225 that enable the given user to access other information not directly related to sending and receiving instant messages. For example, the given user may use the controls to access e-mail messages or other special features of the instant messaging system. The given user also may use the controls 225 to modify preferences for the participant list interface 200.

Figure 3:
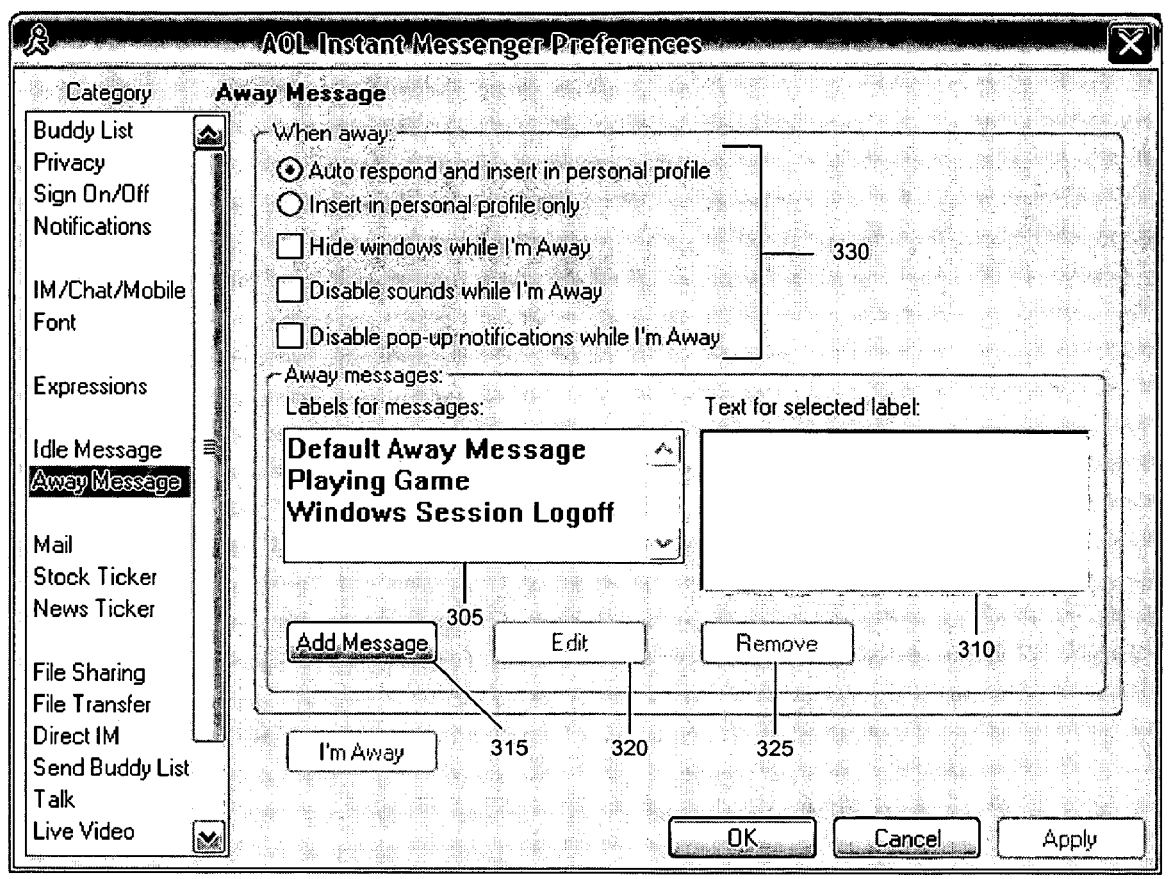
FIGS. 3 and 4 are illustrations of interfaces for specifying an electronic message that describes users of the interfaces.

Referring to FIG. 3, an away message interface 300 enables a user to maintain a set of away messages that may be provided to other users. The away message interface 300 includes a message list 305 and a message text box 310. An add message button 315 enables the user to add an away message to the set of away messages. An edit button 320 enables the user to edit one of the away messages in the set, and a remove button 325 enables the user to remove one of the away messages from the set. The away message interface 300 also includes other controls 330 that enable the user to specify how the away messages are distributed.

The message list 305 includes a label for each of the away messages. When one of the labels is selected from the message list 305, a corresponding away message is displayed in the message text box 310. In addition, selecting a label from the message list 305 identifies a corresponding away message for distribution to other users desiring information describing the user. Selecting the remove button 325 after one of the away messages has been selected from the list 305 causes a corresponding away message to be removed from the set of away messages. Consequently, the selected label is removed from the list 305.

Figure 4:
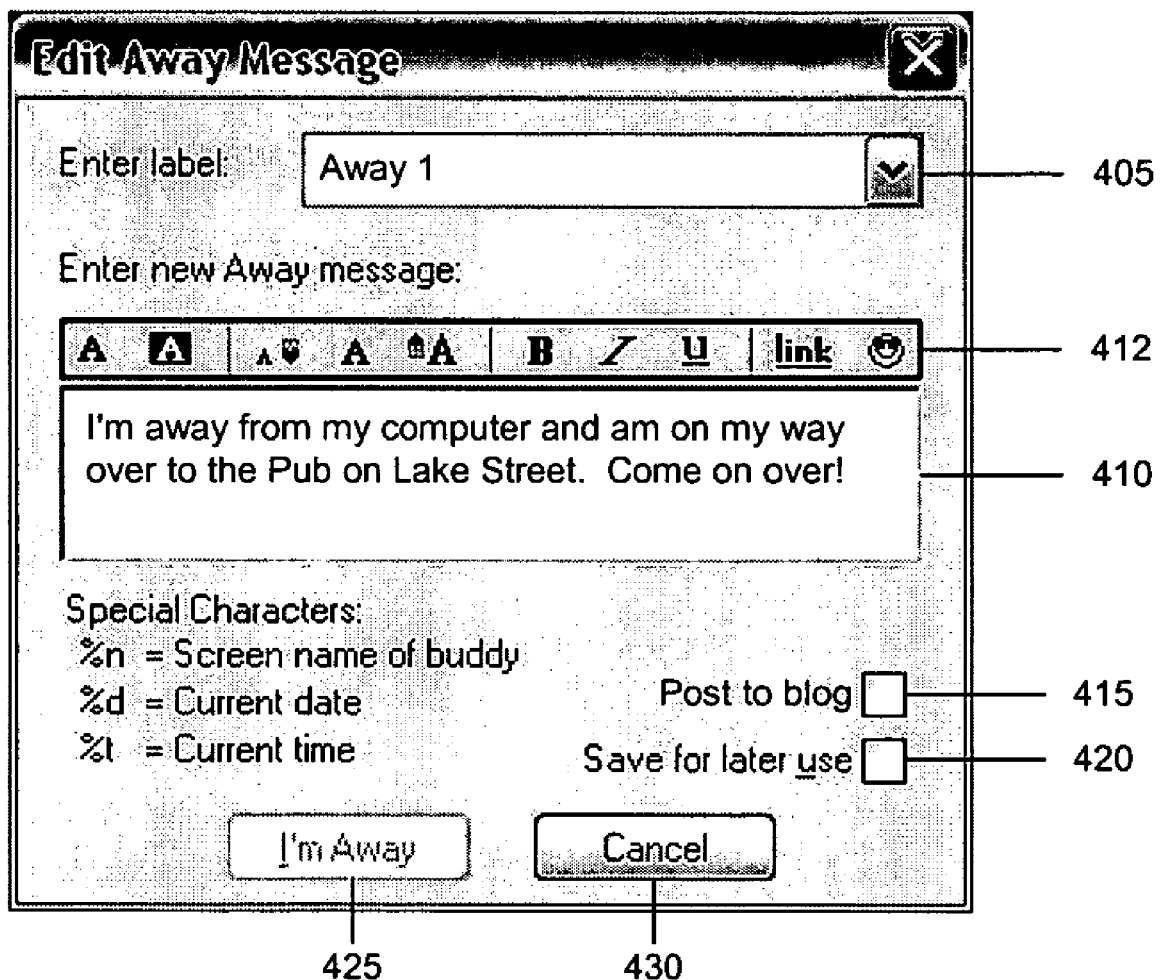

Referring also to FIG. 4, selecting the add message button 315 or the edit button 320 causes an away message specification interface 400 to be displayed. Alternatively or additionally, the away message specification interface 400 may be displayed when a user desires to specify or edit an away message that will not necessarily be included in the set of away messages. In an implementation where an away message for a user includes a profile of the user, other portions of the away message that are not the profile of the user may be specified and edited with the interface 400. In other implementations, the entire away message, including the profile of the user, may be specified or edited with the interface 400. In some implementations, the functionality of the interface 400 may be integrated into the interface 300.

The away message specification interface 400 includes a label text box 405, a message text box 410, and text controls 412 with which the away message may be specified. A checkbox 422 causes the away message to be posted to a web log (blog) of the user when selected. A checkbox 415 causes the away message to be saved for later use when selected. Selecting a button 425 indicates that specification of the away message is complete, and selecting a button 430 dismisses the interface 400 without using the away message.

A label for the away message may be specified in the label text box 405. If the away message is added to the set of away messages, the label specified in the label text box 405 is listed in the message list 305. The text of the away message may be specified in the text box 410. The text controls 412 may be used to change the appearance of the text included in the text box. For example, the size, foreground color, background color, and typeface of the text may be modified with the controls 412. In addition, special characters and features, such as emoticons and hyperlinks may be inserted into the text with the controls 412.

Selecting the checkbox 415 causes the away message to be posted to a blog of the user. In one implementation, an indication of the time at which the away message was specified with the interface 400 also may be posted to the blog. Posting away messages to the blog of the user as the away messages are specified provides a history of previously specified away messages. Because each away message includes information describing the user, the blog includes historical information describing the user at various points in time. Access to the blog, or to particular away messages included in the blog, may be limited by privacy preferences set by the user. For example, the user may indicate that the blog is accessible to all users, to no users, or only to users included in the user's participant list.

Selecting the checkbox 420 causes the away message to be added to the set of away messages displayed in the interface 300. Specifically, the label specified in the label text box 405 is listed in the message list 305, and the text of the away message specified in the text box 410 may be displayed in the message text box 310 when the label is selected from the list 305.

Selecting the button 425 indicates that specification of the away message is complete. As a result, the away message may be provided to users desiring information describing the user. In one implementation, selecting the button 425 selects the away message for distribution to the users and also adds the away message to the set of away messages reflected by the interface 300. In another implementation, selecting the button 425 simply adds the away message to the set of away messages. In such an implementation, the user may use the interface 300 to select the away message for distribution, as described above.

Selecting the button 430 discards the away message that has been specified with the interface 400. For example, if a new message is being created, then the entire message is discarded when the button 430 is selected. If an existing away message is being edited, then changes made to the existing away message are discarded when the button 430 is selected. Selecting either of the buttons 425 and 430 causes the interface 400 to be dismissed.

Figure 5A:
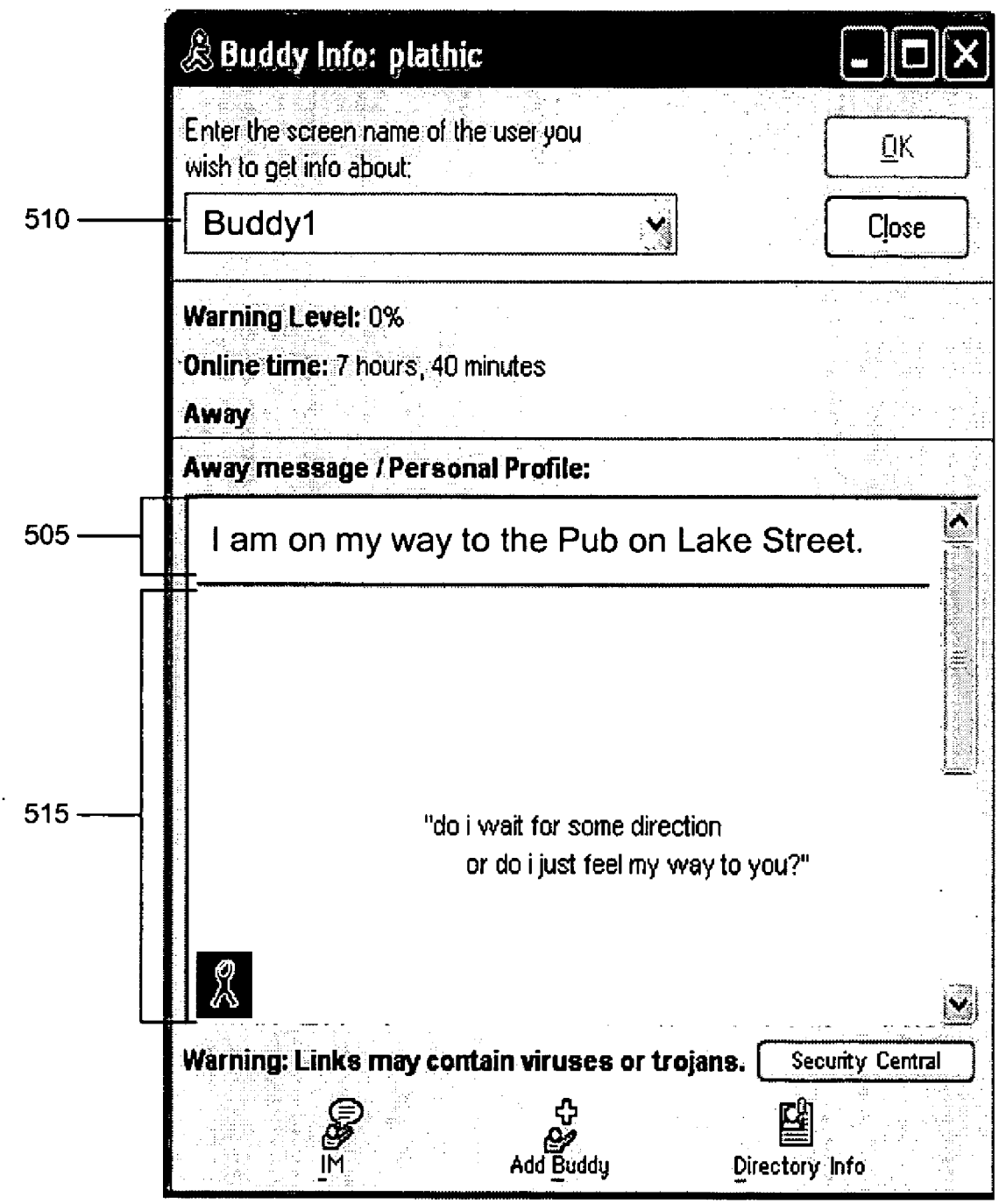
FIGS. 5A and 5B are illustrations of interfaces displaying electronic messages that describe users.
Figure 5B:

Referring to FIGS. 5A and 5B, an away message display interface 500 displays an away message 505 describing a particular user. The user for which the away message is displayed is identified in a text box 510. The away message display interface 500 also may display separately a profile 515 of the user, particularly when the profile is not included in the away message 505. The combination of the away message 505 and the profile 515 provides information describing the user to an individual for whom the away message display interface 500 is displayed.

Figure 6:
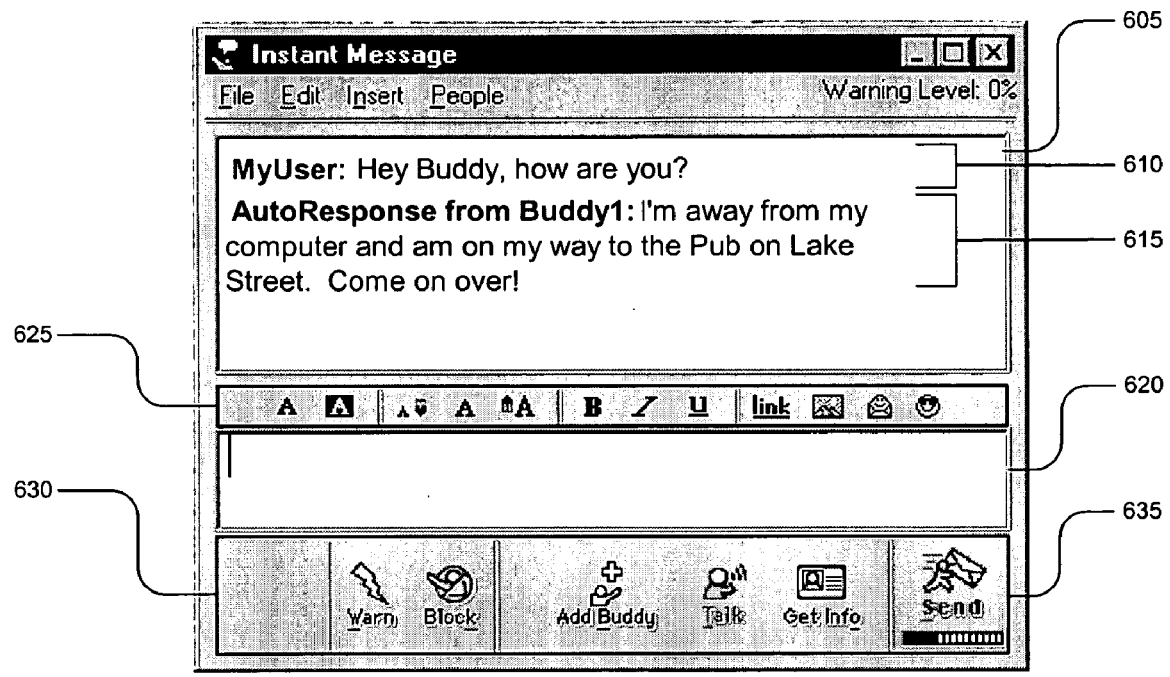
FIG. 6 is an interface for displaying an electronic message describing a user as a response to an electronic message to the user.

Referring to FIG. 6, an away message including information describing a user may be displayed in an instant messaging interface 600, which enables instant messages to be sent and received. The instant messaging interface 600 may be used by a user to exchange communications with another user, such as a user whose screen name is displayed on a participant list interface of the user, such as the participant list interface 200 of FIG. 2A. After a sender of instant messages is notified that a recipient is present and available to send and receive instant messages, the sender may use the instant messaging interface 600 to exchange instant messages with the recipient.

The instant messaging interface 600 includes a message history box 605 that lists the instant messages sent between the sender and the recipient. The message history box 605 also may be referred to as a message transcript box 605. Each message is presented with an indication of an identifier by which the sender or the recipient is identified as the sender of the message. Each message listed in the message history box 605 also includes the text of the instant message sent by the sender or the recipient. For example, the message history box 605 includes a message 610 sent by a user with a screen name "MyUser" and a message 615 sent by a user with a screen name "Buddy1." In one implementation, each message listed in the message history box 605 includes a time stamp of when the message was sent. The users that sent the messages 610 and 615 are the recipient and the sender, respectively. In some implementations, the message history box may include automatically sent messages that were not specified manually by the sender of the recipient. For example, the automatically sent messages may inform the recipient that the sender has not used the instant messaging interface 600 for more than a threshold amount of time.

In typical implementations, the message history box 605 includes only those instant messages sent between the sender and the recipient after the interface 600 was displayed initially. In other implementations, the instant messages reflected in the message history box 605 may be saved when the interface 600 is dismissed, for example, such that the message history box 605 may be repopulated with those instant messages when the interface 600 is displayed again at a later time.

The instant messaging interface 600 also includes a message specification box 620 in which the sender may specify a message to be sent to the recipient. The sender may enter text to be sent to the recipient in the message specification box 620. The instant message interface 600 includes a set of format controls 625 that may be used to format the text entered in the message specification box 620. More particularly, the controls in the set of format controls 625 enable the user to change the size, foreground color, background color, style, and effects of the text entered in the message specification box 620. The set of format controls 625 also includes controls for inserting objects that are not plain text, such as hyperlinks and emoticons, into the message specification box 620.

After a message has been specified in the message specification box 620, the message may be sent by selecting a send button 625 included in a second control set 630. After the send button 635 has been selected, the text that has been entered in the message specification box 620 is sent to the recipient, and the message specification box 620 is cleared. The message is added to the message history box 605. The message also is displayed in a message history box 605 of an instance of the instant messaging interface 600 being viewed by the recipient. Also included in the second control set 630 are controls for warning instant message senders, blocking instant messages from particular senders, or adding the sender to a participant list used by the sender.

The recipient with the identifier "Buddy1" may be unavailable to send and receive instant messages at a time when the sender with the identifier "MyUser" sent the message 610. As a result, the recipient may have chosen a descriptive message to be sent automatically to other users, such as the sender, that send instant messages to the recipient. The message 615 may represent such a descriptive message, which is why the message 615 is identified as an "AutoResponse from Buddy1." The message 615 may be processed or simply presented to the sender with the instant messaging interface 600. The sender may continue to send instant messages to the recipient, if so desired.

Figure 7:
FIG. 7 is an interface for displaying electronic messages describing multiple users.

Referring to FIG. 7, an away message display interface 700 is similar to the away message display interfaces 500 of FIGS. 5A and 5B. However, instead of displaying information describing a single user, the away message display interface 700 displays information describing multiple users. The multiple users may be users included in a participant list of a user of the interface 700. In one implementation, the interface 700 is a web page that may be displayed in a web browser. In another implementation, the interface 700 may be configured for display on a device with limited display capabilities, such as a mobile device.

Identifiers 705a-705d for the users are displayed on the left side of the interface 700. Away messages 710a-710d describing the users are displayed next to the identifiers 705a-705d. A profile or a user may be displayed next to the identifier of the user in the interface 700, for example, when the profile is not included in the away message for the user, or when the user has not otherwise indicated that the profile is not to be displayed. For example, the interface 700 includes a profile 715a of the user corresponding to the identifier 705a and a profile 715b of the user corresponding to the identifier 705d. In the illustrated implementation, the profiles 715a and 715b are displayed next to the identifiers 705a and 705d.

In some implementations, a user of the interfaces 500, 600, and 700 may be enabled to submit comments on the away messages and profiles displayed in the interfaces 500, 600, and 700. The comments may be made available to other users that view the displayed away messages and profiles. For example, the comments may be included as part of the away messages and profiles, which will result in their automatic distribution to the other users.

Figure 8:
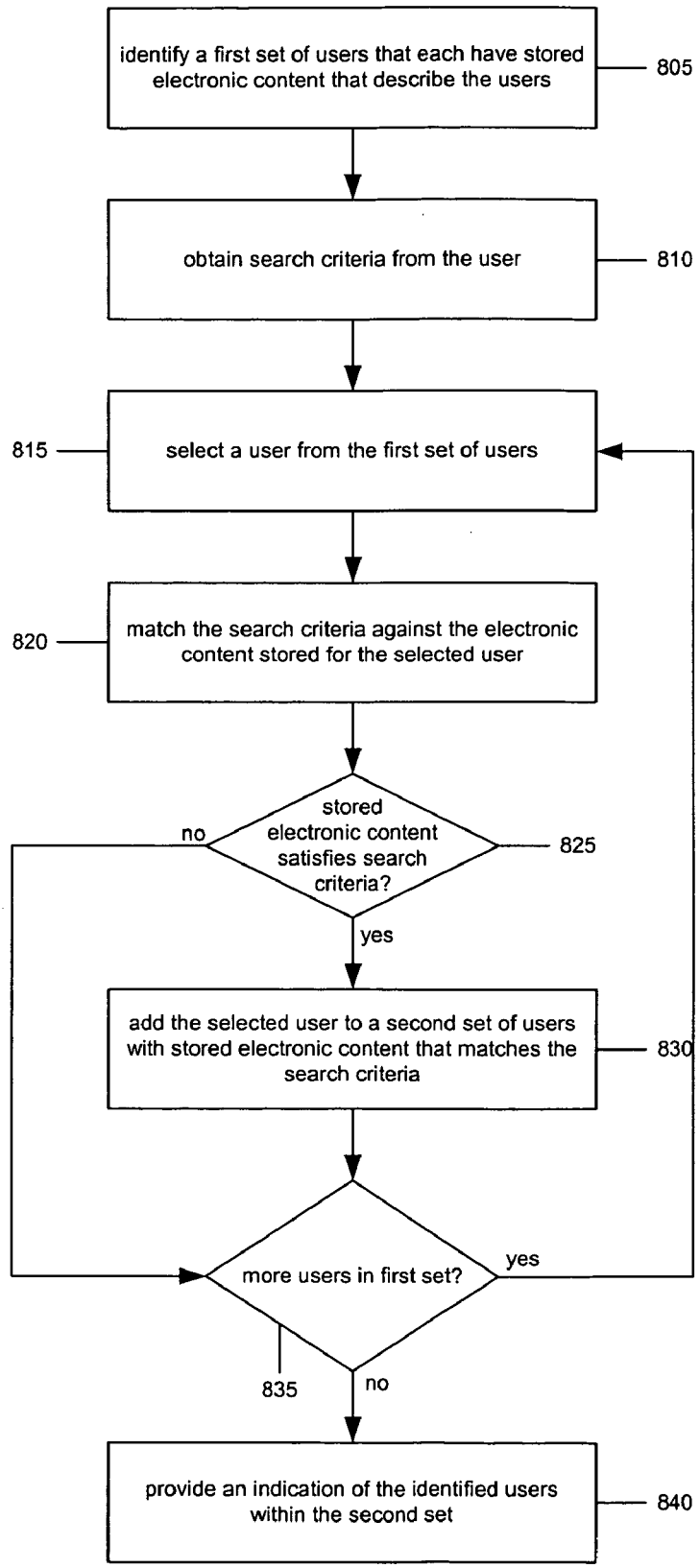
FIG. 8 is a flow chart of a process for identifying users with stored electronic messages describing the users that satisfy a search criterion.

Referring to FIG. 8, a process 800 is executed to permit a user to search electronic content describing users. The users with descriptive information that matches search criteria specified by the searching user are identified as search results for the searching user. The process 800 may be executed by a client device used by the searching user, such as one of the client devices 108a and 108b of FIG. 1. Alternatively or additionally, the process 800 may be executed by an IM server, such as the IM server 102 of FIG. 1. For example, the process 800 may be executed by an IM manager application of the IM server, such as the IM manager application 104 of FIG. 1. For ease of discussion, the process 800 will be described below as being performed by the client device.

The client device initially identifies a first set of users (805). In one implementation, the users included in the first set are included in a participant list of users for whom presence information is monitored for the searching user. In another implementation, the first set of users may reflect users from a general user population. In yet another implementation, the first set of users may represent a group of users sharing a particular characteristic, such as a group of users that attended a particular college or a group of employees of a company. In such an implementation, the searching user may be required to be included in the first set of users. Each of the users in the first set has stored electronic content that describes the user.

In one implementation, the searching user manually selects some or all of the users included in the first set of users. For example, the searching user may select a pre-defined group of users from the participant list for inclusion in the first set. For example, the searching user may select the "Family" group 215b from the participant list 205 of FIG. 2 to include the users included in the "Family" group 215b in the first set. Alternatively or additionally, the searching user may select individual users from the participant list. In another implementation, the client device automatically identifies the users from the participant list that are included in the first set. For example, the client device may automatically determine that all users included in the participant list are to be included in the first set. In another implementation, the searching user may be enabled to add users to and remove users from the first set of users after the first set of users has been specified by the client device.

The client device obtains search criteria from the searching user (810). The client device may display an interface to the searching user, and the searching user may use the interface to specify the search criteria. The search criteria may include a string of text that is to be matched against the electronic content describing the users in the first set. The search criteria may include wildcard characters (e.g., "*") and other characters indicating the relationships between the terms included in the search criteria (e.g., "+," "AND," and "OR"). The search criteria may specify a characteristic, location, activity, or event for which the user is searching. In addition to specifying new search criteria, the user may access previously-specified search criteria using the interface. Providing previously-specified search criteria to the user may enable the user to run a search multiple times without specifying the same search criteria multiple times. For example, the user may be enabled to specify a set of related search terms once and to include all of the related search terms in the search criteria using, for example, only a name of the set of related search terms. In one implementation, the client device may automatically generate the search criteria based on information describing the searching user, such as an away message of the searching user. The client device may save the obtained search criteria for later use, for example, when the process 800 is executed again at a later time.

The client device then selects a user from the first set of users (815) and accesses the electronic content describing the selected user. As described above, the electronic content may include a current or previous away message of the selected user, a profile of the selected user, comments on the away message or the profile of the selected user, a blog of previous away messages of the selected user, or an indication of a location of the selected user. In addition, the electronic content may include other information related to the selected user, such as information from a user information feed for the selected user, a history of messages exchanged with the selected user, and other information of interest to the selected user. If the electronic content describing the selected user includes a hyperlink, information located at the hyperlink may be accessed and included as part of the electronic content. The selected user may have made different sets of electronic content available to different users. In such a case, the client device accesses the electronic content that is accessible to the searching user.

The client device matches the search criteria against the accessed electronic content (820). For example, the client device determines whether one or more words included in the search criteria are included in the electronic content. The client device may determine whether synonyms of one or more words included in the search criteria are included in the electronic content. If the electronic content is an away message that includes a title, the client device also may match the search criteria against a title of the electronic content. In one implementation, a high quality match exists between the search criteria and the electronic content when a high percentage of the search criteria is found within the electronic content. Furthermore, the order in which the words from the search criteria are found within the electronic content may affect the quality of the match between the search criteria and the electronic content.

When determining if the electronic content includes a word from the search criteria, the client device may determine whether the electronic content includes a synonym of the word. For example, the client device may access an electronic thesaurus, or another indication of synonyms of the words of the search criteria, to identify variations of the search criteria. The electronic content may match the search criteria when the electronic content matches one of the variations.

If the search criteria indicate a location, the client device may determine whether a location indicated by the electronic content is within a threshold distance of the location indicated by the search criteria. If the search criteria indicate multiple locations, the client device may determine whether a location indicated by the electronic content is one of the multiple locations indicated by the search criteria. In another implementation, another metric may be used to determine the quality of the match between the search criteria and the electronic content.

The client device determines whether the search criteria match the electronic content (825). In one implementation, the client device assigns a numerical score that is indicative of the quality of the match between the search criteria and the electronic content. The numerical score may be a percentage of the search criteria that is included in the electronic content. The client device may determine that the search criteria matches the electronic content when the numerical score exceeds a threshold. Whether the electronic content is identified as matching the search criteria may depend on the technique used to match the search criteria to the electronic content.

If the electronic content matches the search criteria, the client device adds the selected user to a second set of users with stored electronic content that matches the search criteria (830). In other words, the selected user is identified as a search result. Regardless of whether the selected user is identified as a search result, the client device determines whether the first set includes additional users whose electronic content has not yet been matched against the search criteria (835). If so, then the client device selects another user from the first set (815). The client device matches the electronic content that has been stored for the selected user against the search criteria (820) to determine whether the selected user should be added to the second set as a search result (825, 830). In this manner, all of the users included in the first set are sequentially tested for inclusion in the second set. In one implementation, the users included in the second set may be sorted or filtered after all of the users from the first set have been tested. For example, the users may be sorted based on an amount of electronic content describing the users that was available, a number, frequency, or length of messages that the users exchanged with the searching users, a time at which the users last sent a message to the searching user, or an order in which the users appear within the participant list of the searching user.

The client device then provides an indication of the identified users within the second set (840). In one implementation, the client device provides a visual indication of the identified users on the interface with which the searching user specified the search criteria. In another implementation, the client device provides a visual indication of the identified users on a participant list interface, such as the participant list interface 200 of FIG. 2. For example, the client device may add a group for identifiers of the identified users to the participant list displayed in the participant list interface. The client device may add the group to the participant list if one or more criteria are satisfied. For example, the client device may add the group only if the second set of users includes at least three users. The client device also may highlight the identifiers of the identified users within the participant list. The client device may display a graphical icon that is indicative of inclusion in the second set next to the identifiers of the identified users within the participant list.

In another implementation, the client device may provide an audible indication of the identified users to the searching user. For example, the client device may audibly read the identifiers of the identified users or a pre-recorded message to the searching user. Alternatively or additionally, the client device may leave a voicemail for the searching user in which the identifiers of the identified users are read.

In addition, the client device may provide an indication of the electronic content of the identified users. For example, for each of the identified users, the client device may provide an indication of a portion of the electronic content of the user that matches the search criteria. In some implementations, the client device may provide indications of electronic content of only a subset of the identified users. The searching user may identify the subset of the identified users for which indications of corresponding electronic content is provided.

In one implementation, the process 800 may be executed by another computer system in response to a request that is received from a computer system used by the searching user. For example, the other computer system may be configured to receive and respond to instant messages. The searching user may send an instant message to the computer system to request execution of the process 800. The instant message may indicate new or previously specified search criteria to be used in the process 800. In response, the computer system may execute the process 800 using the received search criteria, and may provide an indication of the users that match the search criteria to the searching user as an instant message sent back to the searching user. Such an implementation may be particularly useful when the searching user is using a mobile device with limited processing capabilities for executing the process 800 locally.

In another implementation, the process 800 may be executed automatically without input from the searching user. For example, the process 800 may be executed using search criteria that were previously specified and saved by the searching user. The searching user may specify which of the saved search criteria are to be used for automatic searches. If users matching the search criteria are identified, then the user may be presented with an alert of the matching users. For example, an instant message, a text message, or an e-mail message including an indication of the matching users may be sent to the searching user. Alternatively or additionally, the process 800 may be executed automatically using other search criteria that have not been specified by the searching user. For example, the client system may receive search criteria from an IM server, such as the IM server 102 of FIG. 1. Alternatively or additionally, the client system may identify the search criteria automatically, for example, based on electronic messages and web pages read by the searching user.

Figure 9:
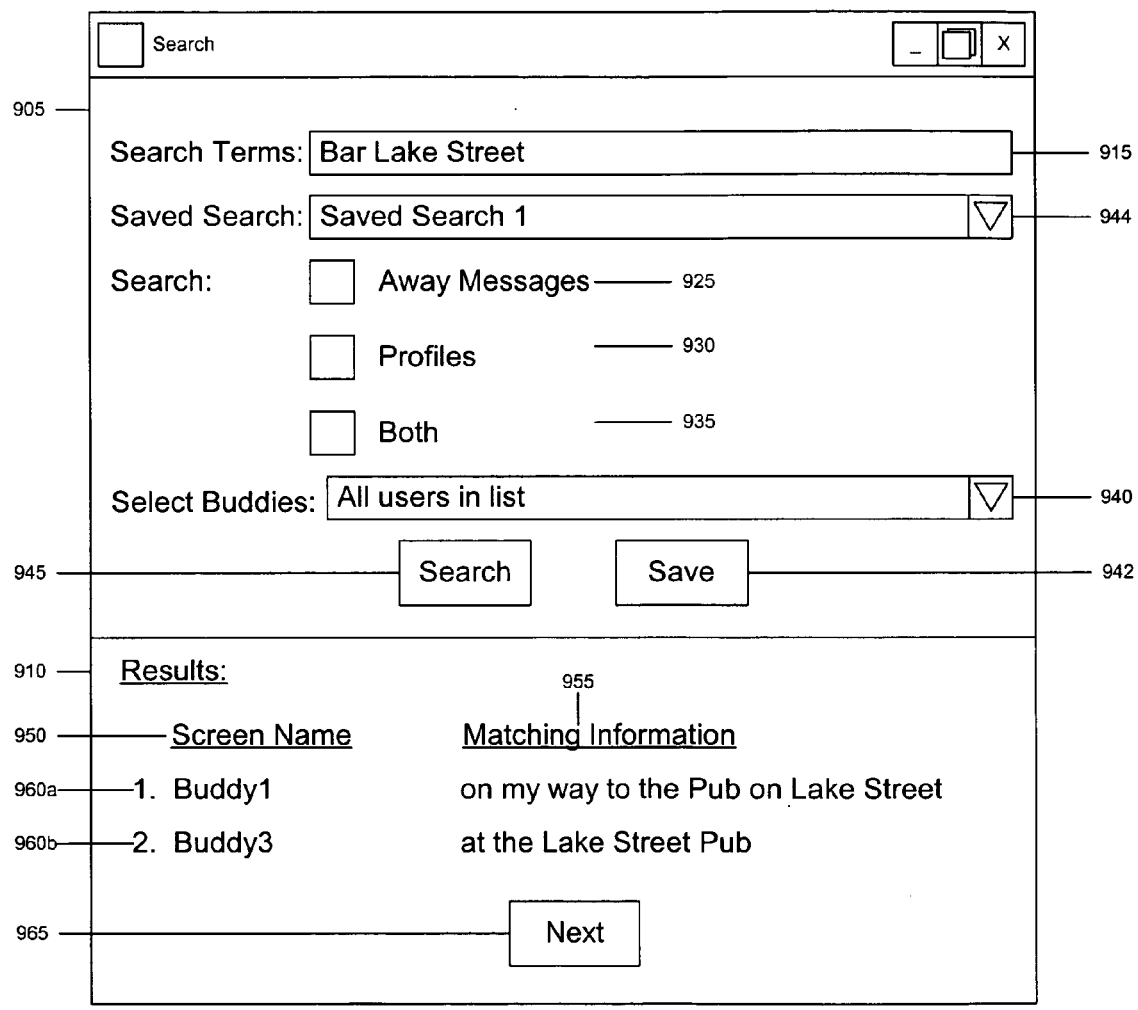
FIG. 9 is an illustration of an interface for specifying a search criterion and viewing electronic messages describing users that satisfy the search criterion.

Referring to FIG. 9, a searching interface 900 may be used by a user to search away messages and profiles of users included in a list of users of an electronic communications system, such as the participant list 205 of FIG. 2, that is maintained by the user. The searching interface includes a search criteria section 905 into which details of a search to be performed are specified. The searching interface 900 also includes a results section 910 in which the results of the search are presented. The search criteria section 905 includes a search criteria text field 915 into which criteria for the search may be entered. The search criteria section 905 also includes three checkboxes 925, 930, and 935 that may be used to indicate whether to search away messages, profiles, or both away messages and profiles of the users included in the list. A selection box 940 may be used to identify a set of users that are to be searched. The search criteria specified in the search criteria section 905 may be saved for later use through selection of a save button 942, and the saved search criteria may be accessed at a later time from a selection box 944.

A search button 945 is used to start the search once the details of the search have been specified. The search results section 910 includes headings 950 and 955, and search results 960a and 960b are presented under the headings 950 and 955. The results section 910 also may include a next button 965 that may be selected to display more search results when all of the search results may not be displayed in the search results section 910 at one time.

Search criteria for a search being specified in the search criteria section 905 may be entered in the search criteria text field 915. The search criteria may identify a characteristic, location, activity, or event for which the user is searching. For example, the search criteria may indicate that the user is searching for other users that have a particular characteristic, are at a particular location, are participating in a particular activity, or are attending a particular event.

The checkbox 925 indicates that only away messages of the users included in the list are to be searched when selected, the checkbox 930 indicates that only profiles of the users included in the list are to be searched when selected, and the checkbox 935 indicates that both away messages and profiles of the users included in the list are to be searched when selected. In some implementations, instead of only one checkbox 925 for all away messages, the interface 900 may include a separate checkbox for each type of away message, including online away messages, offline away messages, location away messages, and mobile away messages. Other implementations of the interface 900 may include other checkboxes indicating other types of electronic content to be searched, such as user information feeds for the users in the list or histories of messages exchanged with the users in the list. The checkboxes 925, 930, and 935 may be mutually exclusive in that only one of the checkboxes 925, 930, and 935 may be selected at once. In one implementation, one of the checkboxes 925, 930, and 935 must be selected when the search button 945 is selected.

A default set of users may be selected in the selection box 940 when the searching interface 900 is first displayed to the user. For example, the default set may be a system parameter. The user may select a different set of users with the selection box 930. The selection box 940 may include an option corresponding to an entire user population, all of the users included in the list of users, each group of users that is included within the list of users, and each user included in the list of users. The selection box 940 also may include options for other groups of users to which the user belongs, such as a group of users that attend a college attended by the user, or a group of users that work for an employer of the user.

The search criteria specified with the text field 915, the checkboxes 925, 930, and 935, and the selection box 920 may be saved for later use through selection of the save button 942. The user may be prompted to provide a name for the search criteria such that the user may easily identify the search criteria at a later time. Once saved, the name of the search criteria may be provided as an option that may be selected from the selection box 920. Selecting a name from the selection box may populate the text field 915, the checkboxes 925, 930, and 935, and the selection box 920 based on the search criteria corresponding to the selected name. Enabling the user to select previously specified search criteria saves the user from having to specify the same search criteria multiple times. This may be particularly useful when the user is using a device on which specification of the search criteria may be difficult or time consuming, such as a mobile device.

The search button 945 runs a search using the details specified in the search criteria section 905. For example, if the checkbox 925 is selected, the process 800 of FIG. 8 may be executed to identify the users included in the list of users that have away messages that match what is specified in the search criteria text field 915.

The search results 960a and 960b returned by the search are presented in the search results section 910. Each of the search results 960a and 960b corresponds to a user included in the set of users selected with the selection box 940. The search results section 910 includes a name heading 950 under which is placed an identifier of each of the corresponding users. The search results section 910 also includes a matching information heading 955 under which is placed an indication of the information describing the corresponding users that matches what is specified in the search criteria text field 915. In some implementations, each of the search results 960a and 960b may include an indication of the quality of the match between the descriptive content and the search criteria. In other implementations, each of the search results 960a and 960b may be selected to reveal the descriptive content of the corresponding users.

As illustrated in FIG. 5A, the user with the identifier "Buddy1" has indicated in the away message 510 that he is going to the pub on Lake Street. As illustrated in FIG. 5B, the user with the identifier "Buddy3" has indicated in the away message 510 that he is already at the Lake Street pub. The search criteria that have been specified in the text field indicate that the user of the search interface 900 is searching for users with away messages or profiles that include something about a bar on Lake Street. Because the users with the identifiers "Buddy1" and "Buddy3" have indicated that they are on their way to, or are at, a pub on Lake Street, those users are identified as matching the search criteria. Therefore, the search results 960a and 960b are presented in the search results section 910 for those users. Even though the away message of the matching users do not include the word "bar," The away messages were still identified as matching because "pub" is a synonym of "bar."

Figure 10A:
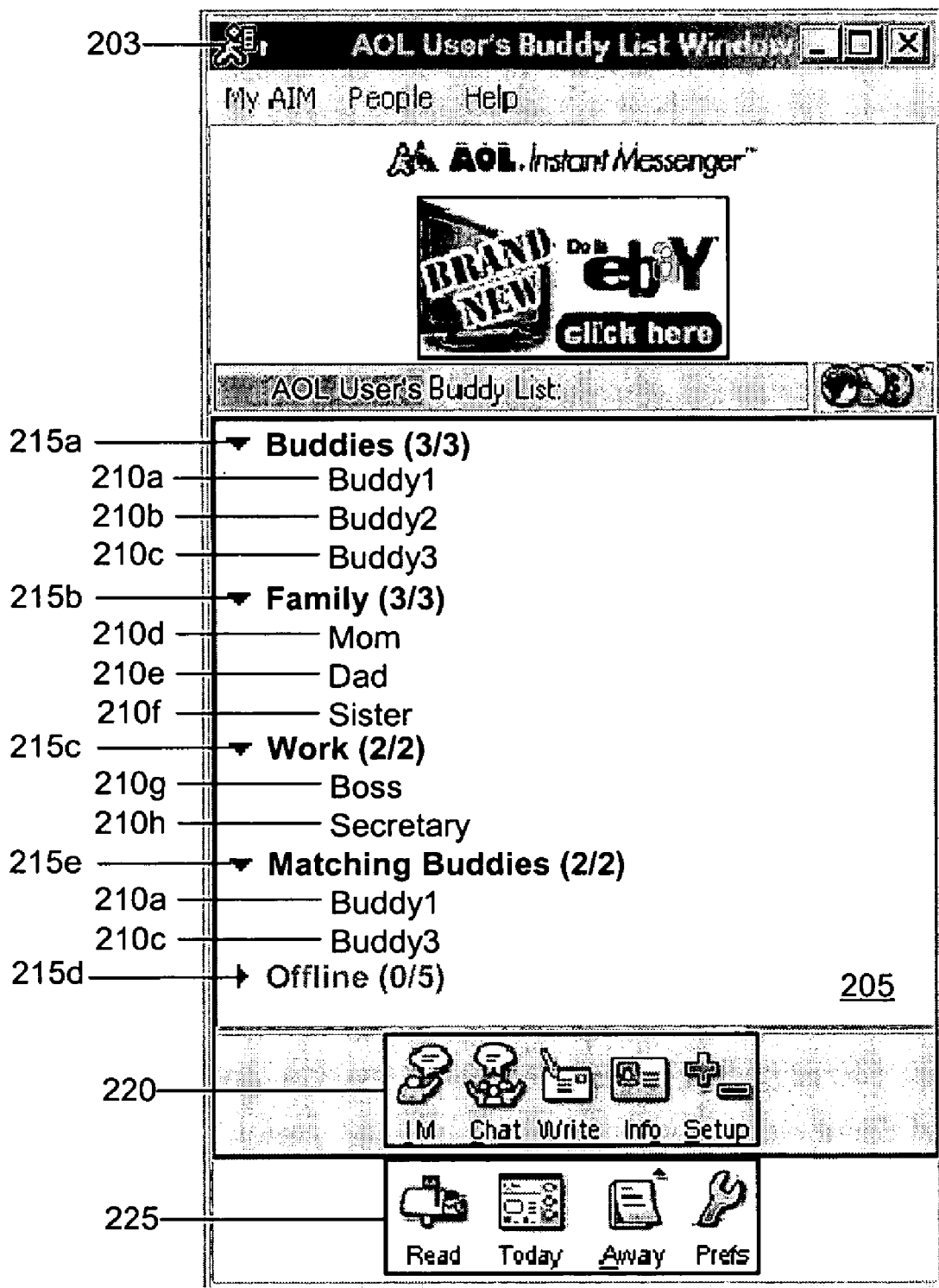
FIGS. 10A-10C are illustrations of interfaces for identifying users with whom electronic messages may be exchanged that have stored electronic messages that satisfy a search criterion.
Figure 10B:
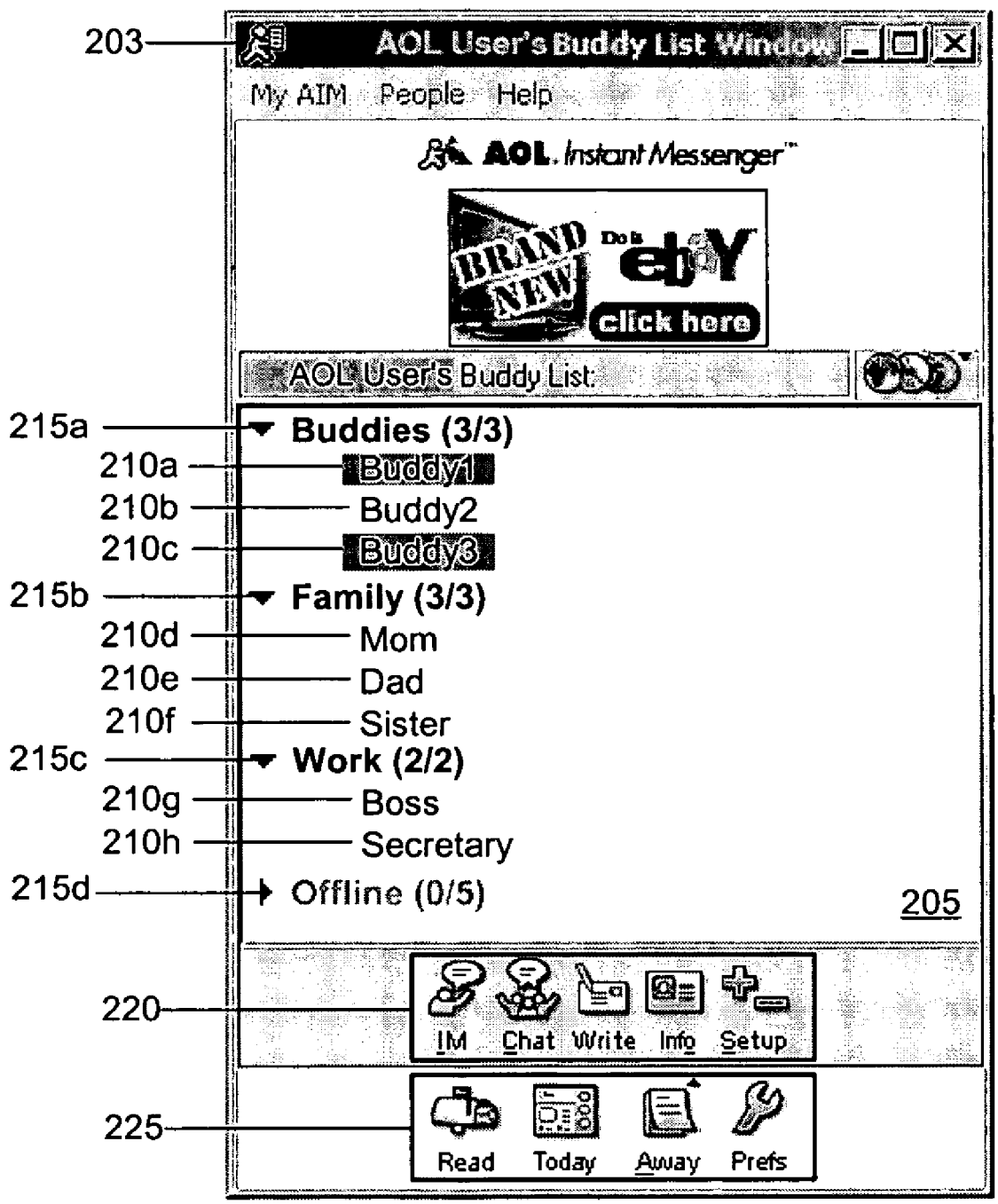
Figure 10C:
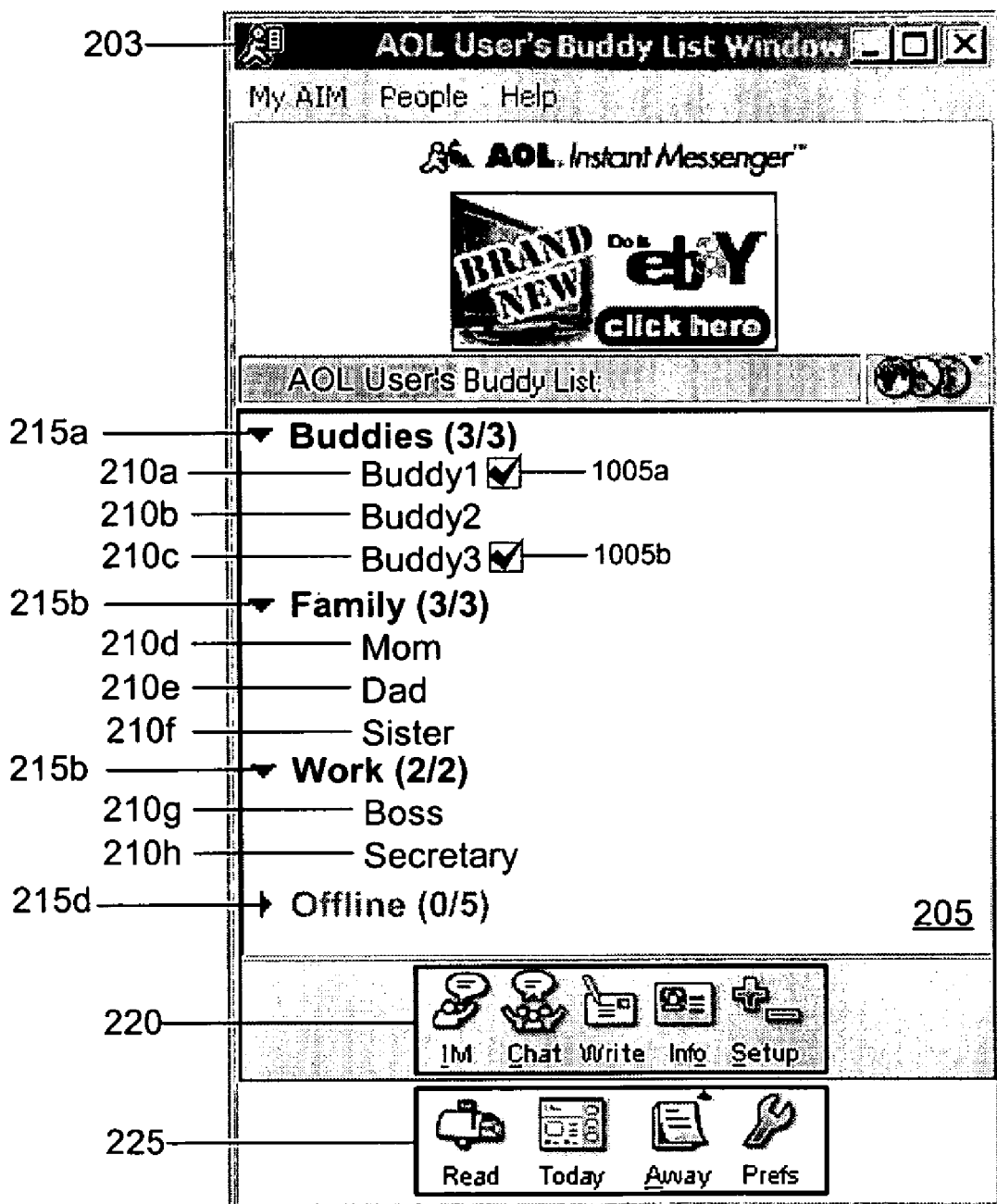

Referring to FIGS. 10A-10C, the participant list interface 200 of FIG. 2 may be augmented with additional information after the process 800 of FIG. 8 is executed to identify users included in the displayed participant list 205 with away messages and profiles that match search criteria specified by a user of the participant list interface 200. Using the example from FIG. 9, the users with the identifiers 210a and 210c have descriptive information that matches the search criteria specified on the search interface 900. Consequently, the participant list interface 200 is augmented to visually distinguish the identifiers 210a and 210c from the other identifiers 210b and 210d-210h that are displayed on the interface 200.

For example, in the implementation illustrated in FIG. 10A, an additional group 215e is created within the participant list 205 for the identifiers 210a and 210c. Consequently, the identifiers 210a and 210c are associated both with the group 215a and the group 215e. In the implementation illustrated in FIG. 10B, the identifiers 210a and 210c are highlighted in place to visually distinguish the identifiers 210a and 210c from the other identifiers 210b and 210d-210h, which are not highlighted. In one implementation, the identifiers 210a and 210b are highlighted in a manner that is different from how an identifier is highlighted when selected from the participant list 205. For example, the identifiers 210a and 210c may be highlighted with a color that is different from the color used to highlight a selected identifier. In the implementation illustrated in FIG. 10C, icons 1005a and 1005b are displayed next to the identifiers 210a and 210c, respectively, to indicate that information describing the corresponding users matches the search criteria. In the implementations illustrated in FIGS. 10A-10C, the identifiers 210a and 210c are not moved from their original positions within the participant list 205, which may enable the user of the interface 200 to easily identify the identifiers 210a-210c from within the participant list 205.

In one implementation, an indication of the quality of the match to the search criteria may be included in the participant list interface 200 for each of the matching users. For example, each of the identifiers 210a and 210c in the group 215e may be presented with a numerical indication of the quality of the match. As another example, the color with which the identifiers 210a and 210c are highlighted may be indicative of the quality of the match. More particularly, the identifier 210a may be highlighted in green to indicate a high quality match, and the identifier 210c may be highlighted in yellow to indicate a medium quality match. As yet another example, the icons 1005a and 1005b that are displayed next to the identifiers 210a and 210c may be indicative of the quality of the match.

As another example, the screen names 210a and 210c may be selectable from the participant list interface 200 to reveal an indication of the quality of the match to the search criteria. For example, selecting the screen names 210a or the screen name 210c may cause a tool tip or some other pop-up window to be displayed with an indication of the quality of the match between the search criteria and the information describing the user corresponding to the selected screen name. The indication of the quality of the match may be a numerical value for the quality or a more qualitative description of the quality.

The user of the interface 200 may be presented with a notification that additional information identifying the users that match the search criteria is being added to the interface 200. The user may be enabled to accept the additional information such that the matching users are visually identified in the participant list interface 200. Alternatively, the given user may dismiss the additional information, in which case, the participant list interface 200 is not changed. The given user also may be enabled to accept some of the additional information and dismiss the rest of the additional information. In addition, the additional information may be presented until the searching user indicates that the additional information no longer should be presented, for a predetermined amount of time, or while other criteria for presentation remain satisfied.

Figure 11:
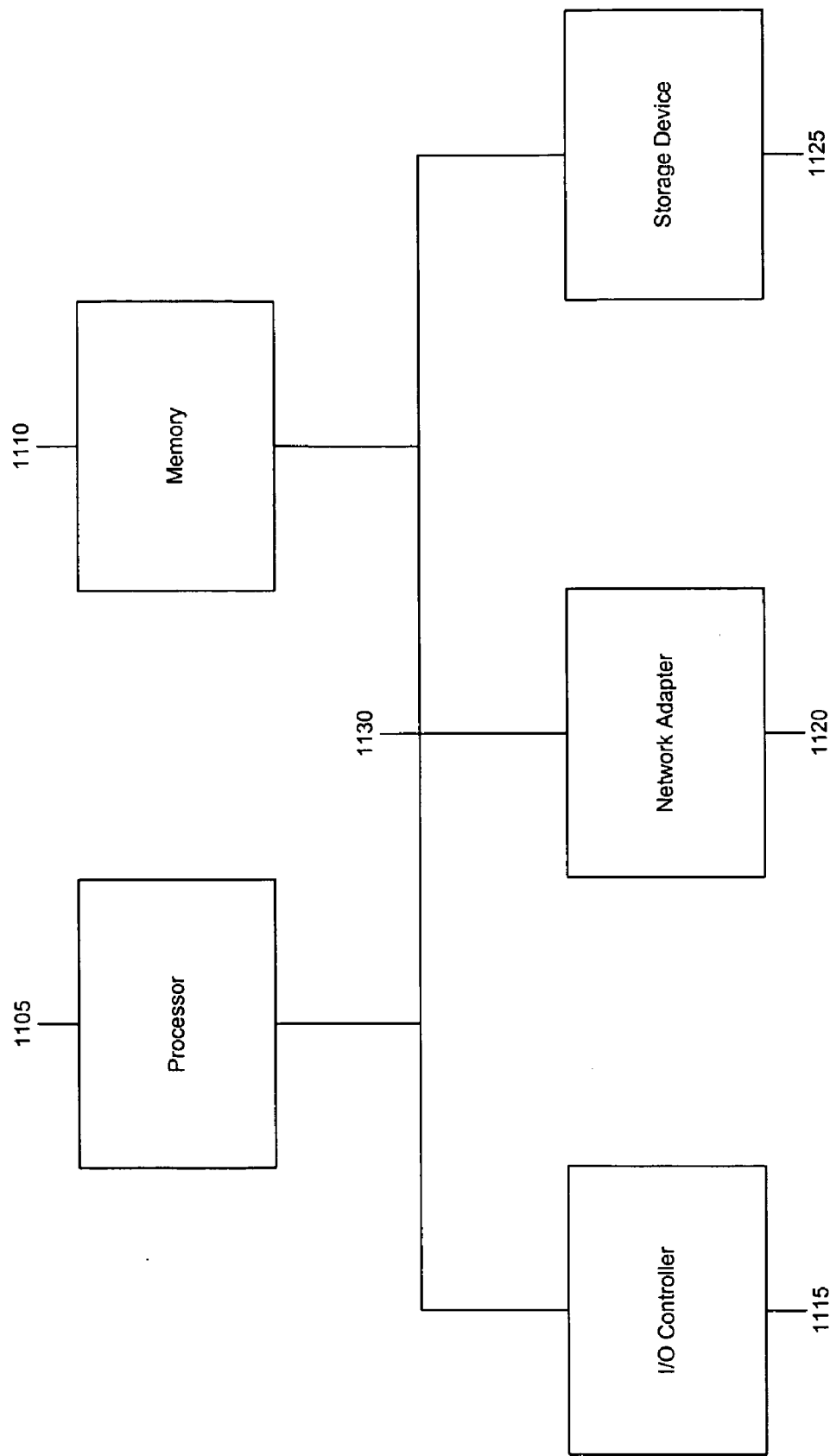
FIG. 11 is a block diagram of a computing device that may be included within the client and server systems shown in FIG. 1, according to one implementation.

FIG. 11 is a block diagram of a computing device 1100 that may be included within the IM server 102 and/or the client devices 108a and 108b. The computing device 1100 may represent a general-purpose computer, a special-purpose computer, or a mobile computing device, such as a portable computer, a mobile telephone, or a PDA. The computing device 1100 includes a processor 1105, a memory 1110, an input/output controller 1115, a network adapter 1120, and a storage device 1125. The components 1105, 1110, 1115, 1120, and 1125 are interconnected using a system bus 1130.

The processor 1105 is capable of processing instructions for execution within the computing device 1100. In one implementation, the processor 1105 is a single-threaded processor. In another implementation, the processor 1105 is a multi-threaded processor. The processor 1105 is capable of processing instructions stored in the memory 1110 or on the storage device 1125 to display graphical information for a GUI on an external input/output device that is coupled to the input/output controller 1115.

The memory 1110 stores information within the computing device 1100. In one implementation, the memory 1110 is a computer-readable medium. In one implementation, the memory 1110 is a volatile memory unit. In another implementation, the memory 1110 is a non-volatile memory unit.

The input/output controller 1115 manages input/output operations for the computing device 1100. In one implementation, the input/output controller 1115 is coupled to an external input/output device, such as a keyboard, a pointing device, or a display unit that is capable of displaying to a user, various GUIs, such as the GUIs shown in the previous figures.

The computing device 1100 uses the network adapter 1120 to communicate with other network devices. If, for example, the client device 108a is a mobile device that includes the computing device 1100, the computing device 1100 uses its network adapter 1120 to communicate with the host server 106 over a wireless connection.

The storage device 1125 is capable of providing mass storage for the computing device 1100. In one implementation, the storage device 1125 is a computer-readable medium. In various different implementations, the storage device 1125 may be a floppy disk device, a hard disk device, an optical disk device, or a tape device.

In one implementation, a computer program product is tangibly embodied in an information carrier. The computer program product contains instructions that, when executed, perform one or more methods, such as those described above. The information carrier is a computer- or machine-readable medium, such as the memory 1110, the storage device 1125, or a propagated signal.

A number of implementations have been described. Nevertheless, it will be understood that various modifications may be made. Accordingly, other implementations are within the scope of the following claims.

What is claimed is:

1. A method of searching electronic content in an instant-messaging application, the method comprising:

obtaining input that specifies a search criterion and that further identifies a first set of users, wherein the search criterion indicates an event that the users in the first set may attend and each user in the first set has stored electronic content that provides information about that user including indicating an event that the user is attending;

searching the stored electronic content associated with each user in the first set;

identifying a second set of users that includes users in the first set with stored electronic content that satisfies the specified search criterion including stored electronic content that indicates the event indicated by the search criterion; and providing an indication of the identified users within the second set.

2. A method of searching electronic content that is designated as revealing present status information for one or more users of an instant messaging system, the method comprising:

obtaining input that specifies a search criterion that indicates one or more of an event that users may attend, an activity in which users may participate, a characteristic with which users may be associated, and a location at which users may be located;

obtaining input that specifies a first set of users of an instant messaging system for which stored electronic content that is designated as revealing present status information is to be searched;

for each of one or more individual users in the first set of users:

accessing stored electronic content that is designated as revealing present status information for the individual user, and searching the accessed stored electronic content that is designated as revealing present status information for the individual user for information that satisfies the specified search criterion that indicates one or more of the event that users may attend, the activity in which users may participate, the characteristic with which users may be associated, and the location at which users may be located;

based on results of searching the accessed stored electronic content that is designated as revealing present status information for each individual user, identifying a second set of users that includes one or more individual users in the first set of users for which the stored electronic content that is designated as revealing present status information for each of the individual users of the second set of users includes information that satisfies the specified search criterion that indicates one or more of an event that users may attend, an activity in which users may participate, a characteristic with which users may be associated, and a location at which users may be located; and providing an indication of the identified second set of users.

3. The method of claim 2 wherein:

obtaining input that specifies a search criterion includes obtaining input that specifies a search criterion that indicates a characteristic with which users may be associated;

searching the accessed stored electronic content that is designated as revealing present status information for each individual user includes searching the accessed stored electronic content that is designated as revealing present status information for each individual user for information related to the characteristic with which users may be associated that is indicated by the search criterion; and identifying a second set of users includes identifying a second set of users that includes one or more individual users in the first set of users for which the stored electronic content that is designated as revealing present status information for each of the individual users of the second set of users includes information related to the characteristic with which users may be associated that is indicated by the search criterion.

4. The method of claim 2 wherein:

obtaining input that specifies a search criterion includes obtaining input that specifies a search criterion that indicates a location at which users may be located;

searching the accessed stored electronic content that is designated as revealing present status information for each individual user includes searching the accessed stored electronic content that is designated as revealing present status information for each individual user for information related to the location at which users may be located that is indicated by the search criterion; and identifying a second set of users includes identifying a second set of users that includes one or more individual users in the first set of users for which the stored electronic content that is designated as revealing present status information for each of the individual users of the second set of users includes information related to the location at which users may be located that is indicated by the search criterion.

5. The method of claim 4 wherein:

obtaining input that specifies a search criterion that indicates a location at which users may be located includes obtaining input that specifies a search criterion that indicates a physical geographic location at which users may be located;

searching the accessed stored electronic content that is designated as revealing present status information for each individual user for information related to the location at which users may be located that is indicated by the search criterion includes searching the accessed stored electronic content that is designated as revealing present status information for each individual user for information related to the physical geographic location at which users may be located that is indicated by the search criterion; and identifying a second set of users that includes one or more individual users in the first set of users for which the stored electronic content that is designated as revealing present status information for each of the individual users of the second set of users includes information related to the location at which users may be located that is indicated by the search criterion includes identifying a second set of users that includes one or more individual users in the first set of users for which the stored electronic content that is designated as revealing present status information for each of the individual users of the second set of users includes information related to the physical geographic location indicated by the search criterion.

6. The method of claim 4 wherein:

obtaining input that specifies a search criterion that indicates a location at which users may be located includes obtaining input that specifies a search criterion that indicates multiple locations at which users may be located;

searching the accessed stored electronic content that is designated as revealing present status information for each individual user for information related to the location at which users may be located that is indicated by the search criterion includes searching the accessed stored electronic content that is designated as revealing present status information for each individual user for information related to the multiple locations at which users may be located indicated by the search criterion; and identifying a second set of users that includes one or more individual users in the first set of users for which the stored electronic content that is designated as revealing present status information for each of the individual users of the second set of users includes information related to the location at which users may be located that is indicated by the search criterion includes identifying a second set of users that includes one or more individual users in the first set of users for which the stored electronic content that is designated as revealing present status information for each of the individual users of the second set of users includes information related to the multiple locations at which users may be located indicated by the search criterion.

7. The method of claim 4 wherein identifying a second set of users that includes one or more individual users in the first set of users for which the stored electronic content that is designated as revealing present status information for each of the individual users of the second set of users includes information related to the location at which users may be located that is indicated by the search criterion includes identifying a second set of users that includes one or more individual users in the first set of users for which the stored electronic content that is designated as revealing present status information for each of the individual users of the second set of users includes information related to a location that is within a threshold distance of the location at which users may be located that is indicated by the search criterion.

8. The method of claim 4 wherein:
searching the accessed stored electronic content that is designated as revealing present status information for each individual user for information related to the location at which users may be located that is indicated by the search criterion includes searching the accessed stored electronic content that is designated as revealing present status information for each individual user for different names for the location at which users may be located that is indicated by the search criterion; and
identifying a second set of users that includes one or more individual users in the first set of users for which the stored electronic content that is designated as revealing present status information for each of the individual users of the second set of users includes information related to the location at which users may be located that is indicated by the search criterion includes identifying a second set of users that includes at least one individual user in the first set of users for which the stored electronic content that is designated as revealing present status information for the at least one individual user includes a different name for the location at which users may be located that is indicated by the search criterion.

9. The method of claim 2 wherein:
accessing stored electronic content that is designated as revealing present status information for each individual user includes accessing, for each individual user, a stored electronic message indicating the availability of the individual user to send and receive electronic messages; and
searching the accessed stored electronic content that is designated as revealing present status information for each individual user includes searching, for each individual user, the stored electronic message indicating the availability of the individual user to send and receive electronic messages.

10. The method of claim 9 wherein accessing the electronic message for each individual user includes accessing an audio data, video data, graphical data, or text message for each individual user.

11. The method of claim 2 wherein the stored electronic content for at least one user includes an indication of a location of the at least one user that was specified by the at least one user.

12. The method of claim 2 wherein providing an indication of the identified second set of users includes providing an indication of at least some of the information included in the stored electronic content that satisfies the search criterion.

13. The method of claim 12 wherein providing an indication of at least some of the information included in the stored electronic content that satisfies the search criterion comprises enabling a user to whom the indication is provided to identify at least one of the individual users of the second set of users.

14. The method of claim 2 wherein providing an indication of the identified second set of users includes providing a visual indication of the identified second set of users.

15. The method of claim 14 wherein providing a visual indication of the identified second set of users comprises:
determining that at least one of the users in the second set of users has an identifier that is included within a list of identifiers of users for which presence information is monitored for a user to whom the visual indication is provided; and
highlighting the identifier of the at least one user within the list of identifiers.

16. The method of claim 14 wherein providing a visual indication of the identified second set of users comprises:
determining that at least one of the users in the second set of users has an identifier that is included within a list of identifiers of users for which presence information is monitored for a user to whom the visual indication is provided; and
displaying a graphical icon in proximity to the identifier of the at least one user within the list of identifiers.

17. The method of claim 14 wherein providing a visual indication of the identified second set of users comprises:
determining that at least one of the users in the second set of users has an identifier that is included within a list of identifiers of users for which presence information is monitored for a user to whom the visual indication is provided; and
including the identifier of the at least one user in a group within the list for identifiers of users with stored electronic content that includes information that satisfies the specified search criterion.

18. The method of claim 17 further comprising adding the group to the list of identifiers.

19. The method of claim 18 wherein adding the group comprises adding the group when more than a threshold number of identifiers of users are to be included in the group.

20. The method of claim 14 wherein providing a visual indication of the identified second set of users includes displaying a graphical user interface that identifies the individual users of the second set of users as users with stored electronic content that includes information that satisfies the specified search criterion.

21. The method of claim 2 wherein providing an indication of the identified second set of users comprises providing an audible indication of the identified second set of users.

22. The method of claim 2 wherein obtaining input that specifies a search criterion includes obtaining the input that specifies the search criterion from a text-entry field on a user interface that is used by a user to enter the input.

23. The method of claim 2 wherein obtaining input that specifies a search criterion includes obtaining an input that specifies a search criterion that was previously specified by the user.

24. The method of claim 2 wherein:
obtaining input includes obtaining input from a personal computing device used by a user to enter the input; and
providing an indication of the identified second set of users includes providing the indication of the identified second set of users to the personal computing device.

25. The method of claim 24 wherein obtaining the input from and providing the indication to the personal computing device includes obtaining the input from and providing the indication to a mobile device.

26. The method of claim 2 wherein obtaining input that specifies a first set of users includes obtaining input that specifies all users for which presence information is monitored for a user.

27. The method of claim 2 wherein obtaining input that specifies a first set of users includes obtaining input that specifies a group of users sharing a characteristic.

28. The method of claim 2 wherein obtaining input that specifies a first set of users includes obtaining input that specifies at least two users for which presence information is monitored for a user.

29. The method of claim 2 wherein obtaining input that specifies a first set of users includes obtaining input from a user of a list of users for which online presence information is monitored for the user and that includes the first set of users.

30. The method of claim 2 wherein obtaining input comprises automatically identifying the input.

31. The method of claim 2 wherein:
obtaining input that specifies a search criterion includes obtaining input that specifies a search criterion that indicates an activity in which users may participate;
searching the accessed stored electronic content that is designated as revealing present status information for each individual user includes searching the accessed stored electronic content that is designated as revealing present status information for each individual user for information related to the activity in which users may participate that is indicated by the search criterion; and
identifying a second set of users includes identifying a second set of users that includes one or more individual users in the first set of users for which the stored electronic content that is designated as revealing present status information for each of the individual users of the second set of users includes information related to the activity in which users may participate that is indicated by the search criterion.

32. The method of claim 2 wherein:
obtaining input that specifies a search criterion includes obtaining input that specifies a search criterion that indicates an event that users may attend;
searching the accessed stored electronic content that is designated as revealing present status information for each individual user includes searching the accessed stored electronic content that is designated as revealing present status information for each individual user for information related to the event that users may attend that is indicated by the search criterion; and
identifying a second set of users includes identifying a second set of users that includes one or more individual users in the first set of users for which the stored electronic content that is designated as revealing present status information for each of the individual users of the second set of users includes information related to the event that users may attend that is indicated by the search criterion.

33. The method of claim 2 wherein:
accessing stored electronic content that is designated as revealing present status information for each individual user includes accessing an away message specified by each individual user;
searching the accessed stored electronic content that is designated as revealing present status information for each individual user includes searching the away message specified by each individual user; and
identifying a second set of users that includes one or more individual users in the first set of users for which the stored electronic content that is designated as revealing present status information for each of the individual users of the second set of users includes information that satisfies the specified search criterion includes identifying a second set of users that includes one or more individual users in the first set of users for which the away messages for each of the individual users of the second set of users includes information that satisfies the specified search criterion.

34. The method of claim 2 further comprising determining for which individual users in the first set of users stored electronic content that is designated as revealing present status information has been activated, wherein:
accessing stored electronic content that is designated as revealing present status information includes accessing stored electronic content that is designated as revealing present status information only for individual users in the first set of users for which the stored electronic content that is designated as revealing present status information was determined to have been activated; and
searching the accessed stored electronic content that is designated as revealing present status information includes searching the accessed stored electronic content that is designated as revealing present status information only for individuals users in the first set of users for which the stored electronic content that is designated as revealing present status information was determined to have been activated.

35. A tangible computer-readable medium having embodied thereon a computer program that includes instructions that, when executed, result in a computer performing operations for searching electronic content that is designated as revealing present status information for one or more users of an instant-messaging system, comprising:
obtaining input that specifies a search criterion;
identifying a first set of users of an instant messaging system for which stored electronic content that is designated as revealing present status information is to be searched;
for each of one or more individual users in the first set of users:
accessing stored electronic content that is designated as revealing present status information for the individual user, and
searching the accessed stored electronic content that is designated as revealing present status information for the individual user for information that satisfies the specified search criterion;
based on results of searching the accessed stored electronic content that is designated as revealing present status information for each individual user, identifying a second user set that includes one or more individual users in the first set of users for which the stored electronic content that is designated as revealing present status information for each of the individual users of the second set of users includes information that satisfies the specified search criterion; and
providing an indication of the identified second set of users.

36. The tangible computer-readable medium of claim 35 wherein:
the instructions that, when executed, result in a computer obtaining input that specifies a search criterion include instructions that, when executed, result in a computer obtaining input that specifies a search criterion that indicates one or more of an event that users may attend, an activity in which users may participate, a characteristic with which users may be associated, and a location at which users may be located;
the instructions that, when executed, result in a computer searching the accessed stored electronic content that is designated as revealing present status information for each individual user for information that satisfies the specified search criterion include instructions that, when executed, result in a computer searching the accessed stored electronic content that is designated as revealing present status information for each individual user for information that satisfies the specified search criterion that indicates one or more of an event that users may attend, an activity in which users may participate, a characteristic with which users may be associated, and a location at which users may be located; and the instructions that, when executed, result in identifying a second user set that includes one or more individual users in the first set of users for which the stored electronic content that is designated as revealing present status information for each of the individual users of the second user set includes information that satisfies the specified search criterion include instructions that, when executed, result in a computer identifying a second user set that includes one or more individual users in the first set of users for which the stored electronic content that is designated as revealing present status information for each of the individual users of the second user set includes information that satisfies the specified search criterion that indicates one or more of an event that users may attend, an activity in which users may participate, a characteristic with which users may be associated, and a location at which users may be located.

37. A system comprising:

means for obtaining input that specifies a search criterion;

means for identifying a first set of users of an instant messaging system for which stored electronic content that is designated as revealing present status information is to be searched;

means for accessing, for each of one or more individual users in the first set of users, stored electronic content that is designated as revealing present status information for the individual user;

means for searching, for each individual user, the accessed stored electronic content that is designated as revealing present status information for the individual user for information that satisfies the specified search criterion;

means for identifying a second user set that includes one or more individual users in the first set of users for which the stored electronic content that is designated as revealing present status information for each of the individual users of the second set of users includes information that satisfies the specified search based on results of searching the accessed stored electronic content that is designated as revealing present status information for each individual user; and means for providing an indication of the identified second set of users.

38. The system of claim 37 wherein:

the means for obtaining input that specifies a search criterion includes means for obtaining input that specifies a search criterion that indicates one or more of an event that users may attend, an activity in which users may participate, a characteristic with which users may be associated, and a location at which users may be located;

the means for searching the accessed stored electronic content that is designated as revealing present status information for each individual user for information that satisfies the specified search criterion includes means for searching the accessed stored electronic content that is designated as revealing present status information for each individual user for information that satisfies the specified search criterion that indicates one or more of an event that users may attend, an activity in which users may participate, a characteristic with which users may be associated, and a location at which users may be located; and the means for identifying a second user set that includes one or more individual users in the first set of users for which the stored electronic content that is designated as revealing present status information for each of the individual users of the second user set includes information that satisfies the specified search criterion includes means for identifying a second user set that includes one or more individual users in the first set of users for which the stored electronic content that is designated as revealing present status information for each of the individual users of the second user set includes information that satisfies the specified search criterion that indicates one or more of an event that users may attend, an activity in which users may participate, a characteristic with which users may be associated, and a location at which users may be located.

39. A method of searching electronic content that is designated as revealing present status information for one or more users of an instant messaging system, the method comprising:

obtaining input that specifies a search criterion;

identifying a first set of users of an instant messaging system for which stored electronic content that is designated as revealing present status information is to be searched;

for each of one or more individual users in the first set of users:

accessing stored electronic content that is designated as revealing present status information for the individual user, and searching the accessed stored electronic content that is designated as revealing present status information for the individual user for information that satisfies the specified search criterion;

based on results of searching the accessed stored electronic content that is designated as revealing present status information for each individual user, identifying a second user set that includes one or more individual users in the first set of users for which the stored electronic content that is designated as revealing present status information for each of the individual users of the second user set includes information that satisfies the specified search criterion; and providing an indication of the identified second set of users.

40. The method of claim 39 wherein:

identifying a first set of users for which stored electronic content that is designated as revealing present status information is to be searched includes identifying a first set of users for which electronic content that is stored in away message fields and that is designated as revealing present status information is to be searched;

accessing stored electronic content that is designated as revealing present status information for each individual user includes accessing electronic content that is stored in an away message field and that is designated as revealing present status information for the individual user;

searching the accessed stored electronic content that is designated as revealing present status information for the individual user for information that satisfies the specified search criterion includes searching the accessed electronic content that is stored in the away message field and that is designated as revealing present status information for the individual user for information that satisfies the specified search criterion; and identifying a second user set that includes one or more individual users in the first set of users for which the stored electronic content that is designated as revealing present status information for each of the individual users of the second user set includes information that satisfies the specified search criterion includes identifying a second user set that includes one or more individual users in the first set of users for which the electronic content that is stored in the away message fields and that is designated as revealing present status information for each of the individual users of the second user set includes information that satisfies the specified search criterion.

41. The method of claim 39 wherein:

accessing stored electronic content that is designated as revealing present status information for each individual user includes accessing stored electronic content that has been designated by the individual user as revealing present status information for the individual user;

searching the accessed stored electronic content that is designated as revealing present status information for the individual user for information that satisfies the specified search criterion includes searching the accessed stored electronic content that has been designated by the individual user as revealing present status information for the individual user for information that satisfies the specified search criterion; and identifying a second user set that includes one or more individual users in the first set of users for which the stored electronic content that is designated as revealing present status information for each of the individual users of the second user set includes information that satisfies the specified search criterion includes identifying a second user set that includes one or more individual users in the first set of users for which the stored electronic content that has been designated by each of the individual users of the second user set as revealing present status information includes information that satisfies the specified search criterion.

42. The method of claim 39 wherein:

accessing stored electronic content that is designated as revealing present status information for each individual user includes accessing stored electronic content that has been entered, by the individual user, into a field that provides away information to third parties that attempt to contact the individual user;

searching the accessed stored electronic content that is designated as revealing present status information for the individual user for information that satisfies the specified search criterion includes searching the field that provides away information to third parties that attempt to contact the individual user; and identifying a second user set that includes one or more individual users in the first set of users for which the stored electronic content that is designated as revealing present status information for each of the individual users of the second user set includes information that satisfies the specified search criterion includes identifying a second user set that includes one or more individual users in the first set of users for which the fields that provide away information to third parties that attempt to contact each of the individual users of the second user set includes information that satisfies the specified search criterion.

43. The method of claim 39 wherein:

obtaining input that specifies a search criterion includes obtaining input that specifies a search criterion that indicates one or more of an event that users may attend, an activity in which users may participate, a characteristic with which users may be associated, and a location at which users may be located;

searching the accessed stored electronic content that is designated as revealing present status information for each individual user for information that satisfies the specified search criterion includes searching the accessed stored electronic content that is designated as revealing present status information for each individual user for information that satisfies the specified search criterion that indicates one or more of an event that users may attend, an activity in which users may participate, a characteristic with which users may be associated, and a location at which users may be located; and identifying a second user set that includes one or more individual users in the first set of users for which the stored electronic content that is designated as revealing present status information for each of the individual users of the second user set includes information that satisfies the specified search criterion includes identifying a second user set that includes one or more individual users in the first set of users for which the stored electronic content that is designated as revealing present status information for each of the individual users of the second user set includes information that satisfies the specified search criterion that indicates one or more of an event that users may attend, an activity in which users may participate, a characteristic with which users may be associated, and a location at which users may be located.

* * * * *